US012270595B2

(12) United States Patent
Lee et al.

(10) Patent No.: US 12,270,595 B2
(45) Date of Patent: Apr. 8, 2025

(54) REFRIGERATOR AND HOME APPLIANCE

(71) Applicant: SAMSUNG ELECTRONICS CO., LTD., Suwon-si (KR)

(72) Inventors: Chomin Lee, Suwon-si (KR);
Yang-Yeol Gu, Suwon-si (KR);
Dongyeong Kim, Suwon-si (KR);
Byoungmok Kim, Suwon-si (KR);
Yonghan Kim, Suwon-si (KR);
Taecheol Park, Suwon-si (KR);
Yongman Seo, Suwon-si (KR);
Jinyoung Song, Suwon-si (KR);
Yountae Shin, Suwon-si (KR);
Byungkwan Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/519,298

(22) Filed: Nov. 27, 2023

(65) Prior Publication Data

US 2024/0085094 A1 Mar. 14, 2024

Related U.S. Application Data

(63) Continuation of application No. 17/953,005, filed on Sep. 26, 2022, now Pat. No. 11,867,450, which is a
(Continued)

(30) Foreign Application Priority Data

Aug. 20, 2019 (KR) ........................ 10-2019-0101998
May 27, 2020 (KR) ........................ 10-2020-0063401

(51) Int. Cl.
*F25D 23/02* (2006.01)
*A47L 15/42* (2006.01)
(Continued)

(52) U.S. Cl.
CPC .............. *F25D 23/028* (2013.01); *F25C 5/22* (2018.01); *F25D 23/126* (2013.01);
(Continued)

(58) Field of Classification Search
CPC .............. F25D 23/028; F25D 2201/10; F25D 2323/02; F25D 23/02; F25D 2400/18; A47L 15/4265
See application file for complete search history.

(56) References Cited

U.S. PATENT DOCUMENTS 3,790,243 A 2/1974 Whorton, III
4,087,143 A 5/1978 Barnard
(Continued)

FOREIGN PATENT DOCUMENTS

CA 2 536 420 A1 8/2007
CN 1075001 A 8/1993
(Continued)

OTHER PUBLICATIONS

Office Action dated Dec. 20, 2023, in India Application No.
(Continued)

*Primary Examiner* — Hanh V Tran
(74) *Attorney, Agent, or Firm* — STAAS & HALSEY LLP

(57) ABSTRACT

A refrigerator including a main body forming a storage compartment, and a door configured to open and close the storage compartment. The door includes a door body rotatably coupled to the main body and including an insulator therein, a panel body positioned in a front of the door body, a first trim disposed at a first edge of the panel body and configured to be coupled to the door body while being rotated with respect to the door body, and a second trim disposed at a second edge opposite to the first edge of the
(Continued)

panel body and configured to be coupled to the door body when the first trim is coupled to the door body.

8 Claims, 29 Drawing Sheets

Related U.S. Application Data continuation of application No. 16/998,908, filed on Aug. 20, 2020, now Pat. No. 11,480,384.

(51) Int. Cl.
  *F25C 5/20* (2018.01)
  *F25D 23/12* (2006.01)

(52) U.S. Cl.
  CPC ....... *A47L 15/4265* (2013.01); *F25D 2201/10* (2013.01); *F25D 2323/02* (2013.01)

(56) References Cited

U.S. PATENT DOCUMENTS

| | | | |
|---|---|---|---|
| 4,583,796 A | 4/1986 | Nakajima et al. |
| 4,765,697 A | 8/1988 | Gardell |
| 5,358,326 A | 10/1994 | Cherry et al. |
| 6,722,083 B2 | 4/2004 | Herrmann |
| 6,779,859 B2 | 8/2004 | Koons |
| 6,840,773 B2 | 1/2005 | Anderson |
| 7,516,531 B2 | 4/2009 | Crompton et al. |
| 7,673,472 B2 * | 3/2010 | Kwon ............... F25D 23/02 |
| | | | 312/405.1 |
| 8,020,949 B2 | 9/2011 | Davis et al. |
| 8,104,853 B2 | 1/2012 | Kim |
| 8,226,178 B2 | 7/2012 | Kümmel |
| 8,336,974 B2 | 12/2012 | Lee |
| 8,336,975 B2 | 12/2012 | Allard |
| 8,353,564 B2 | 1/2013 | Kim |
| 8,366,221 B2 | 2/2013 | Kim |
| 8,408,665 B2 * | 4/2013 | Lim ............... F25D 23/02 |
| | | | 312/405 |
| 8,567,885 B2 | 10/2013 | Lee |
| 8,668,292 B2 | 3/2014 | Pae |
| 8,789,900 B2 | 3/2014 | Laible |
| 9,185,981 B1 | 11/2015 | Kane |
| 9,279,609 B2 | 3/2016 | Kim |
| 9,339,993 B2 | 5/2016 | Cites |
| 9,448,005 B2 | 9/2016 | Lee et al. |
| 9,476,633 B2 | 10/2016 | Allard |
| 9,500,402 B2 | 11/2016 | Kim |
| 9,528,748 B2 | 12/2016 | Joo |
| 9,671,152 B2 | 6/2017 | Kim et al. |
| 9,702,621 B2 | 7/2017 | Cho et al. |
| 9,810,475 B2 | 11/2017 | Kim |
| 9,890,990 B2 | 2/2018 | Allard |
| 10,145,603 B2 | 12/2018 | Kim et al. |
| 10,317,128 B2 | 6/2019 | Son et al. |
| 10,670,320 B2 | 6/2020 | Lee et al. |
| 11,320,192 B2 | 5/2022 | Lee |
| 11,402,147 B2 | 8/2022 | Lee et al. |
| 2004/0194253 A1 | 10/2004 | Jung |
| 2004/0222725 A1 | 11/2004 | Park et al. |
| 2005/0006997 A1 | 1/2005 | Yoshioka |
| 2006/0152125 A1 | 7/2006 | Anderson et al. |
| 2006/0265960 A1 | 11/2006 | Leimkuehler |
| 2007/0188059 A1 | 8/2007 | Davis et al. |
| 2008/0042537 A1 | 2/2008 | Kim |
| 2008/0143227 A1 | 6/2008 | Kim et al. |
| 2009/0045705 A1 | 2/2009 | Laible et al. |
| 2010/0295425 A1 | 11/2010 | Kim |
| 2011/0025173 A1 | 2/2011 | Ciyanogku |
| 2012/0073202 A1 | 3/2012 | Lee |
| 2012/0169196 A1 | 7/2012 | Marchetti |
| 2012/0280608 A1 | 11/2012 | Park et al. |
| 2013/0323461 A1 | 12/2013 | Shim |
| 2014/0132146 A1 | 5/2014 | Kim et al. |
| 2015/0115782 A1 | 4/2015 | Resch |
| 2015/0145399 A1 | 5/2015 | Joo |
| 2015/0159936 A1 | 6/2015 | Oh et al. |
| 2015/0192353 A1 | 7/2015 | Lee |
| 2016/0061511 A1 | 3/2016 | Park |
| 2016/0117022 A1 | 4/2016 | Kim |
| 2016/0209110 A1 | 7/2016 | Cho |
| 2016/0305706 A1 | 10/2016 | Lim |
| 2016/0334158 A1 | 11/2016 | Joo |
| 2016/0341468 A1 | 11/2016 | Joo |
| 2016/0370052 A1 | 12/2016 | Yang |
| 2017/0082349 A1 | 3/2017 | Jung |
| 2017/0191744 A1 | 7/2017 | Koo |
| 2017/0343273 A1 | 11/2017 | Cheon |
| 2017/0370631 A1 | 12/2017 | Kim |
| 2018/0038626 A1 | 2/2018 | Kim |
| 2018/0087827 A1 | 3/2018 | Lee |
| 2018/0141718 A1 | 5/2018 | Ahlstrom |
| 2018/0142941 A1 | 5/2018 | Arslandkiray |
| 2018/0156529 A1 | 6/2018 | Wantland et al. |
| 2018/0172337 A1 | 6/2018 | Choi |
| 2018/0187951 A1 | 7/2018 | Seo |
| 2018/0187955 A1 | 7/2018 | Son |
| 2018/0187957 A1 | 7/2018 | Seo |
| 2018/0223582 A1 | 8/2018 | Shin |
| 2018/0231299 A1 | 8/2018 | Koo |
| 2018/0274846 A1 | 9/2018 | Kim |
| 2018/0283768 A1 | 10/2018 | Raab et al. |
| 2018/0292127 A1 | 10/2018 | Park |
| 2018/0320952 A1 | 11/2018 | Joo et al. |
| 2019/0024962 A1 | 1/2019 | Lee |
| 2019/0053685 A1 | 2/2019 | Chwalibog |
| 2019/0086141 A1 | 3/2019 | Kim et al. |
| 2019/0120547 A1 | 4/2019 | Staub |
| 2019/0145140 A1 | 5/2019 | Zhang |
| 2019/0178277 A1 | 6/2019 | Schmidt |
| 2020/0072544 A1 | 3/2020 | Lee |
| 2020/0284503 A1 | 9/2020 | Gerstmayr |
| 2020/0326119 A1 | 10/2020 | Lee |
| 2023/0012438 A1 | 1/2023 | Hong |
| 2023/0108392 A1 | 4/2023 | Hong |
| 2024/0085094 A1 | 3/2024 | Lee et al. |

FOREIGN PATENT DOCUMENTS

| | | |
|---|---|---|
| CN | 2499768 Y | 7/2002 |
| CN | 1576757 A | 2/2005 |
| CN | 101231114 A | 7/2008 |
| CN | 201225804 Y | 4/2009 |
| CN | 201731722 U | 2/2011 |
| CN | 102778099 A | 11/2012 |
| CN | 103388953 A | 1/2013 |
| CN | 203771878 U | 8/2014 |
| CN | 104457115 A | 3/2015 |
| CN | 104603561 A | 5/2015 |
| CN | 204 478 688 U | 7/2015 |
| CN | 205860639 U | 1/2017 |
| CN | 106796077 A | 5/2017 |
| CN | 106 802 056 A | 6/2017 |
| CN | 106949692 A | 7/2017 |
| CN | 107328161 A | 11/2017 |
| CN | 107677035 | 2/2018 |
| CN | 107883659 A | 4/2018 |
| CN | 207299701 U | 5/2018 |
| CN | 109 974 369 A | 7/2019 |
| CN | 210130729 U | 3/2020 |
| CN | 112714855 B | 2/2023 |
| DE | G 93 02 426.6 U1 | 6/1994 |
| DE | 29603458 U1 | 5/1996 |
| DE | 10 2007 021 557 A1 | 11/2008 |
| DE | 10 2008 019 421 A1 | 10/2009 |
| DE | 21 2015 000 209 U1 | 5/2017 |
| DE | 10 2017 213 909 A1 | 2/2019 |
| EP | 543696 A1 | 5/1993 |
| EP | 0647821 A | 4/1995 |
| EP | 1 477 753 A1 | 11/2004 |
| EP | 2 730 869 A2 | 5/2014 |
| EP | 2 843 329 A2 | 3/2015 |

(56) References Cited

FOREIGN PATENT DOCUMENTS

| | | |
|---|---|---|
| EP | 2 843 330 A2 | 3/2015 |
| EP | 2 843 330 A3 | 11/2015 |
| EP | 3 147 605 A1 | 3/2017 |
| EP | 3 333 515 A1 | 6/2018 |
| EP | 3 441 704 A1 | 2/2019 |
| EP | 3 857 144 B1 | 6/2023 |
| GB | 1 038 499 A | 8/1966 |
| GB | 2050814 A | 1/1981 |
| GB | 2 186 311 A | 8/1987 |
| JP | S45-1490 Y1 | 1/1970 |
| JP | 55-10981 | 1/1980 |
| JP | 6-312464 A | 11/1994 |
| JP | 07-022382 U | 4/1995 |
| JP | 7-91816 | 4/1995 |
| JP | 2000-146422 A | 5/2000 |
| JP | 2006-194545 | 7/2006 |
| JP | 2014-43998 | 3/2014 |
| JP | 2014-52156 | 3/2014 |
| JP | 2014-52175 | 3/2014 |
| JP | 2014-231974 A | 12/2014 |
| JP | 2015-203510 | 11/2015 |
| JP | 2015-206478 | 11/2015 |
| JP | 2016-38142 | 3/2016 |
| JP | 2016-50760 | 4/2016 |
| JP | 2016-156556 A | 9/2016 |
| KR | 20-0319637 Y1 | 7/2003 |
| KR | 2003-0057087 A | 7/2003 |
| KR | 10-2003-0084071 A | 11/2003 |
| KR | 10-0432749 B1 | 5/2004 |
| KR | 10-2005-0007108 | 1/2005 |
| KR | 10-2005-0099051 A | 10/2005 |
| KR | 1020050104119 A | 11/2005 |
| KR | 10-0634365 B1 | 10/2006 |
| KR | 10-2007-0008823 A | 1/2007 |
| KR | 10-0678674 B1 | 2/2007 |
| KR | 10-2007-0068933 A | 7/2007 |
| KR | 10-0751015 B1 | 8/2007 |
| KR | 10-2008-0057471 A | 6/2008 |
| KR | 10-0861352 B1 | 10/2008 |
| KR | 10-0864724 B1 | 10/2008 |
| KR | 10-0877989 B1 | 1/2009 |
| KR | 10-2010-0057246 A | 5/2010 |
| KR | 10-2012-0039618 A | 4/2012 |
| KR | 10-2013-0053549 A | 5/2013 |
| KR | 10-1307862 B1 | 9/2013 |
| KR | 10-1367034 B1 | 3/2014 |
| KR | 10-2014-0060431 A | 5/2014 |
| KR | 10-1520691 B1 | 5/2015 |
| KR | 10-2015-0061213 A | 6/2015 |
| KR | 10-2015-0082062 | 7/2015 |
| KR | 10-2015-0082063 A | 7/2015 |
| KR | 10-2017-0093994 A | 8/2017 |
| KR | 10-2018-0022232 A | 3/2018 |
| KR | 10-2018-0077586 | 7/2018 |
| KR | 10-2018-0080084 | 7/2018 |
| KR | 10-1895086 B1 | 9/2018 |
| RU | 1778471 A1 | 11/1992 |
| RU | 2259520 C2 | 8/2005 |
| RU | 2432533 C2 | 10/2011 |
| RU | 2 437 042 C2 | 12/2011 |
| RU | 2449228 C2 | 4/2012 |
| RU | 2478174 C2 | 3/2013 |
| RU | 2553249 C2 | 6/2015 |
| RU | 2636160 C1 | 11/2017 |
| WO | WO 2004/104502 A1 | 12/2004 |
| WO | WO 2006/112633 A1 | 10/2006 |
| WO | WO 2009/114706 A1 | 9/2009 |
| WO | WO 2010/141980 A1 | 12/2010 |
| WO | 2014/038190 A1 | 3/2014 |
| WO | WO 2015/033754 A1 | 3/2015 |
| WO | WO 2016/111499 A1 | 7/2016 |
| WO | WO 2017/007164 A1 | 1/2017 |
| WO | WO 2017/119614 A1 | 7/2017 |

OTHER PUBLICATIONS

Office Action dated Feb. 7, 2024, in European Application No. 20 208 115.4.
Office Action dated Feb. 13, 2024, issued in European Application No. 20 208 041.2.
Office Action dated Feb. 28, 2024, issued in European Application No. 20 790 595.1.
U.S. Appl. No. 18/437,957, filed Feb. 9, 2024, Sungeuk Park, Samsung Electronics Co., Ltd.
Office Action dated Jun. 17, 2024 issued in Vietnamese Application No. 1-2021-00824.
Office Action dated Jul. 22, 2024 issued in Mexican Application No. MX/a/2021/001927.
Office Action dated Aug. 6, 2024 issued in Columbia Application No. NC2022/0015916.
Office Action dated Sep. 3, 2024 issued in European Application No. 23 193 354.0.
Office Action dated Sep. 9, 2024 issued in European Application No. 20 208 102.2.
Office Action dated Aug. 28, 2024, issued in U.S. Appl. No. 18/437,957.
Office Action dated Sep. 5, 2024, issued in U.S. Appl. No. 18/232,997.
Office Action dated May 14, 2024, issued in Brazilian Patent Application No. BR 11 2022 014957-3.
Office Action dated May 10, 2024, issued in European Patent Application No. 23 193 354.0.
Office Action dated Jun. 7, 2024, issued in European Patent Application No. 20 208 102.2.
Office Action dated Jun. 26, 2024, issued in European Patent Application No. 20 790 595.1.
Office Action dated Jul. 4, 2024, issued in Australian Patent Application No. 2023210665.
Office Action dated Apr. 29, 2024, issued in Mexico Patent Application No. MX/a/2021/001869.
Notice of Allowance dated Jan. 21, 2021, in U.S. Appl. No. 16/950,663.
Korean Office Action dated Jan. 10, 2021, in corresponding Korean Patent Application No. 10-2020-0063401.
Korean Office Action dated Jan. 24, 2021, in corresponding Korean Patent Application No. 10-2020-0152503.
Korean Office Action dated Jan. 28, 2021, in corresponding Korean Patent Application No. 10-2020-0152558.
International Search Report Dated Dec. 15, 2020, in corresponding International Patent Application No. PCT/KR2020/010518.
Non-Patent Literature, "New Chief Collection", NEWS (Jul. 2, 2020) (http://www.handkookilbo.com/News/Read/A202007020950000365?did=NA).
Non-Patent Literature, "New Samsung Bespoke Refrigerator", NEWS (Apr. 9, 2020) (http://www/mk/co/kr/news/business/view/2020/04/375019/).
Notice of Allowance dated Mar. 10, 2021, in U.S. Appl. No. 16/950,663.
Office Action dated Apr. 1, 2021, in U.S. Appl. No. 17/171,337.
Extended European Search Report dated Apr. 20, 2021, in corresponding European Patent Application No. 20208048.7-1009.
Extended European Search Report dated Mar. 22, 2021, in corresponding European Patent Application No. 20208034.7-1009.
Extended European Search Report dated Mar. 19, 2021, in corresponding European Patent Application No. 20208041.2-1009.
Extended European Search Report dated Mar. 22, 2021, in corresponding European Patent Application No. 20208102.2-1009.
Extended European Search Report dated Mar. 23, 2021, in corresponding European Patent Application No. 20208110.5-1009.
Extended European Search Report dated Mar. 22, 2021, issued in corresponding European Patent Application No. 20208115.4-1009.
Notice of Allowance dated Apr. 15, 2021, in U.S. Appl. No. 17/184,970.
English translation of JP2014231974A; Dec. 11, 2014.
Office Action dated May 5, 2021, in U.S. Appl. No. 17/099,627.
Notice of Allowance date May 13, 2021, in U.S. Appl. No. 17/184,970.
International Search Report dated Apr. 28, 2021, in corresponding International Patent Application No. PCT/KR2021/001068.

(56) References Cited

OTHER PUBLICATIONS

Korean Office Action dated Jun. 29, 2021, in Korean Patent Application No. 10-2021-007565.
Extended European Search Report dated Jul. 1, 2021, in corresponding European Patent Application No. 20800542.1.
Korean Office Action dated May 10, 2021, in corresponding Korean patent Application No. 10-2020-0063401.
Extended European Search Report dated Jun. 21, 2021, in corresponding European Patent Application No. 21159518.6.
Communication pursuant to Article 94(3) EPC dated Jul. 15, 2021, in corresponding European Patent Application No. 20 208 096.6.
Extended European Search Report dated Jun. 22, 2021, in corresponding European Patent Application No. 21159524.4.
Korean Office Action dated Jun. 29, 2021, in corresponding Korean Patent Application No. 10-2021-0074588.
Non-Final Action issued in U.S. Appl. No. 16/950,673 on Aug. 31, 2021.
Non-Final Office Action issued in U.S. Appl. No. 16/950,678 on Aug. 19, 2021.
Non-Final Office Action issued in U.S. Appl. No. 16/950,682 on Aug. 19, 2021.
Non-Final Office Action issued in U.S. Appl. No. 16/950,773 on Sep. 1, 2021.
Non-Final Office Action issued in U.S. Appl. No. 16/998,908 on Jun. 18, 2021.
Final Office Action issued in U.S. Serial No. U.S. Appl. No. 16/998,908 on Oct. 13, 2021.
Final Office Action issued in U.S. Appl. No. 16/998,908 on Oct. 13, 2021.
Non-Final Office Action issued in U.S. Appl. No. 17/099,627 on Oct. 28, 2021.
Notice of Allowance issued in U.S. Appl. No. 16/950,673 on Dec. 8, 2021.
Office Action issued in U.S. Appl. No. 17/474,576 on Dec. 7, 2021.
Office Action issued in U.S. Appl. No. 17/474,594 on Dec. 7, 2021.
Notice of Allowance issued in U.S. Appl. No. 16/950,773 on Dec. 10, 2021.
Non-Final Rejection issued in U.S. Appl. No. 16/849,209 on Oct. 1, 2021.
Non-Final Rejection issued in U.S. Appl. No. 17/099,661 on Oct. 4, 2021.
Non-Final Rejection issued in U.S. Appl. No. 17/099,689 on Oct. 4, 2021.
Extended European Search Report dated Oct. 1, 2021, in corresponding European Patent Application No. 21180812.6.
Extended European Search Report dated Oct. 1, 2021, in corresponding European Patent Application No. 21180820.9.
Chinese Office Action dated Oct. 9, 2021, in corresponding Chinese Patent Application No. 202110250149.5.
Extended European Search Report dated Dec. 2, 2021, in corresponding European Patent Application No. 21701195.6.
Notice of Allowance issued in U.S. Appl. No. 17/185,384 on Jan. 4, 2022.
Office Action issued in U.S. Appl. No. 17/480,854 on Jan. 6, 2022.
Advisory Action issued in U.S. Appl. No. 16/998,908 on Jan. 19, 2022.
Office Action issued in U.S. Appl. No. 16/950,678 on Jan. 18, 2022.
Search Report dated Dec. 6, 2021, in corresponding Russian Patent Application No. 2021104790.
Notice of Allowance dated Dec. 10, 2021, in corresponding Russian Patent Application No. 2021104602.
Search Report dated Dec. 13, 2021, in corresponding Russian Patent Application No. 2021104792.
Chinese Office Action dated Dec. 16, 2021, corresponding Chinese Patent Application No. 202080004419.8.
Chinese Office Action dated Dec. 27, 2021, in corresponding Chinese Patent Application No. 202080004516.7.
Chinese Office Action dated Jan. 20, 2022, in corresponding Chinese Patent Application No. 202110684887.0.
Notice of Allowance issued in U.S. Appl. No. 16/950,682 on Jan. 21, 2022.
Notice of Allowance issued in U.S. Appl. No. 16/849,209 on Jan. 26, 2022.
Notice of Allowance issued in U.S. Serial No. U.S. Appl. No. 17/099,661 on Jan. 26, 2022.
Notice of Allowance issued in U.S. Appl. No. 17/480,388 on Jan. 26, 2022.
Corrected Notice of Allowability issued in U.S. Appl. No. 16/950,773 on Jan. 19, 2022.
Corrected Notice of Allowability issued in U.S. Appl. No. 16/950,773 on Feb. 2, 2022.
Corrected Notice of Allowance issued in U.S. Appl. No. 17/185,384 on Jan. 28, 2022.
Corrected Notice of Allowance issued in U.S. Appl. No. 16/950,673 on Jan. 18, 2022.
Corrected Notice of Allowance issued in U.S. Appl. No. 16/950,673 on Jan. 28, 2022.
Notice of Allowability issued in U.S. Appl. No. 16/950,682 on Feb. 2, 2022.
Office Action issued in U.S. Appl. No. 16/998,908 on Feb. 11, 2022.
Notice of Allowance issued in U.S. Appl. No. 17/480,854 on Mar. 7, 2022.
Office Action issued in U.S. Appl. No. 17/502,677 on Dec. 2, 2021.
Notice of Allowance issued in U.S. Appl. No. 17/474,576 on Mar. 16, 2022.
Notice of Allowance issued in U.S. Appl. No. 17/474,594 on Mar. 17, 2022.
Notice of Allowance issued in U.S. Appl. No. 16/950,678 on Mar. 29, 2022.
Office Action issued in U.S. Appl. No. 17/099,689 on Mar. 21, 2022.
Notice of Allowance issued on Jan. 28, 2022, in Koran Patent Application No. 10-2020-0171257.
Communication under Rule 71(3) issued on Mar. 14, 2022, in European Application No. 20 208 110.5-1009.
Chinese Office Action dated Mar. 25, 2022, in Chinese Patent Application No. 202110219861.9.
Chinese Office Action dated May 6, 2022, in Chinese Patent Application No. 202110250149.5.
Extended European Search Report dated May 6, 2022, in European Patent Application No. 22153645.1.
European Office Action dated May 12, 2022, European Patent Application No. 21 701 195.6.
Office Action dated May 24, 2022, in U.S. Appl. No. 17/502,677.
Office Action dated May 23, 2022, in U.S. Appl. No. 17/099,628.
Notice of Allowance issued May 31, 2022, in U.S. Appl. No. 17/099,689.
Office Action dated Jun. 29, 2022 in Chinese Application No. 202110218847.7.
Office Action dated Jul. 5, 2022 in Chinese Application No. 202110208951.8.
Office Action dated Jul. 11, 2022 in Chinese Application No. 202110684887.0.
Notice of Allowance issued in U.S. Appl. No. 17/673,439 on Apr. 20, 2022.
Corrected Notice of Allowability issued in U.S. Appl. No. 17/673,439 on Jun. 14, 2022.
Corrected Notice of Allowability issued in U.S. Appl. No. 17/673,439 on Jun. 24, 2022.
Notice of Allowance dated Jun. 17, 2022, issued in U.S. Appl. No. 16/998,908.
Office Action issued in U.S. Appl. No. 17/502,677 on Oct. 3, 2022.
Office Action issued in U.S. Appl. No. 17/099,627 on Sep. 28, 2022.
Notice of Allowance dated Dec. 7, 2021, in corresponding Russian Patent Application No. 2021104790.
Search Report dated Dec. 10, 2021, in corresponding Russian Patent Application No. 2021104602.
English Translation for JPH0722382 (Year: 1995).
Office Action dated Nov. 8, 2022, in Chinese Application No. 202110219861.9.
Office Action dated Nov. 23, 2022, in Australian Application No. 2022206717.

(56) References Cited

OTHER PUBLICATIONS

Office Action dated Nov. 2, 2022, in Chinese Application No. 202080004516.7.
Office Action dated Nov. 7, 2022, in European Application No. 20 208 102.2.
Office Action dated Nov. 29, 2022, in European Application No. 20 800 542.1.
Office Action dated Dec. 13, 2022, in Australian Application No. 2022206718.
Office Action dated Aug. 22, 2022, in Australian Application No. 2022206715.
Office Action dated Nov. 25, 2022, in European Application No. 21 701 195.6.
Office Action dated Nov. 29, 2022, in European Application No. 22 153 645.1.
Office Action dated Dec. 19, 2022, in Australian Application No. 2022206716.
Office Action dated Dec. 12, 2022, in European Application No. 21 159 518.6.
Office Action dated Jan. 16, 2023, in Chinese Application No. 202110218847.7.
Office Action dated Jan. 20, 2023, in Chinese Application No. 202110208951.8.
Office Action dated Feb. 13, 2023, in U.S. Appl. No. 17/953,005.
Extended European Search Report dated Jul. 21, 2022, issued in European Application No. 20790595.
Office Action dated Aug. 12, 2022, issued in Russian Application No. 2021104792.
Office Action dated Aug. 22, 2022, issued in Chinese Application No. 202080004516.7.
Office Action dated Aug. 25, 2022, issued in Australian Application No. 2022206716.
Office Action dated Aug. 29, 2022, issued in Australian Application No. 2022206717.
Office Action dated Aug. 30, 2022, issued in Australian Application No. 2022206718.
Office Action issued Mar. 1, 2023, in Australian Application No. 2023200150.
Office Action issued on Feb. 27, 2023, in Korean Application No. 10-2020- 0152603.
Office Action issued Apr. 19, 2023, in European Application No. 20 208 115.4.
Office Action issued Mar. 2, 2023, in Australian Application No. 2022206715.
Office Action issued Apr. 4, 2023, in European Application No. 21 701 195.6.
Office Action issued May 9, 2023, in European Application No. 21 159 524.4.
Office Action issued on Apr. 5, 2023, in European Application No. 20 208 034.7.
Office Action issued on Apr. 6, 2023, in Indonesian Application No. P00202101028.
Office Action issued on May 2, 2023, in India Application No. 202117007903.
Office Action issued on May 9, 2023, in European Application No. 20 208 041.2.
Notice of Allowance dated May 18, 2023, in U.S. Appl. No. 17/099,627.
Notice of Allowance dated May 19, 2023, in U.S. Appl. No. 17/502,677.
Corrected Notice of Allowance dated May 30, 2023, in U.S. Appl. No. 17/502,677.
Final Office Action dated Jun. 23, 2023, in U.S. Appl. No. 17/953,005.
Office Action dated Jun. 14, 2023, in European Application No. 23 162 903.1.
Office Action dated Jul. 13, 2023, in Indonesia Application No. P-00202100825.
Office Action dated Jun. 28, 2023, in European Application No. 20 208 048.7.
Office Action dated Jun. 30, 2023, in Australia Application No. 2020258215.
Office Action dated Jul. 26, 2023, in Vietnam Application No. 38250/SHTT-SC.
Notice of Allowance issued Aug. 28, 2023, in U.S. Appl. No. 17/953,005.
Office Action dated Sep. 12, 2023, in U.S. Appl. No. 17/869,089.
Notice of Allowance dated Nov. 16, 2023, in U.S. Appl. No. 17/869,089.
European Search Report dated Sep. 21, 2023, in European Application No. 23 16 2903.
Office Action dated Sep. 22, 2023, in India Application No. 202118008042.
European Search Report dated Oct. 13, 2023, in European Application No. 20 208 041.2.
European Search Report dated Sep. 11, 2023, in European Application No. 23 19 3354.
U.S. Appl. No. 17/953,005, filed Sep. 26, 2022, Chomin Lee, Samsung Electronics Co., Ltd.
U.S. Appl. No. 16/950,663, filed Nov. 17, 2020, Chomin Lee, Samsung Electronics Co., Ltd.
U.S. Appl. No. 16/950,679, filed Nov. 17, 2020, Chomin Lee, Samsung Electronics Co., Ltd.
U.S. Appl. No. 16/950,678, filed Nov. 17, 2020, Chomin Lee, Samsung Electronics Co., Ltd.
U.S. Appl. No. 16/950,682, filed Nov. 17, 2020, Chomin Lee, Samsung Electronics Co., Ltd.
U.S. Appl. No. 17/171,337, filed Feb. 9, 2021, Chomin Lee, Samsung Electronics Co., Ltd.
U.S. Appl. No. 16/849,209, filed Apr. 15, 2020, Chomin Lee, Samsung Electronics Co., Ltd.
U.S. Appl. No. 17/099,627, filed Nov. 16, 2020, Chomin Lee, Samsung Electronics Co., Ltd.
U.S. Appl. No. 17/099,661, filed Nov. 16, 2020, Chomin Lee, Samsung Electronics Co., Ltd.
U.S. Appl. No. 17/099,689, filed Nov. 16, 2020, Chomin Lee, Samsung Electronics Co., Ltd.
U.S. Appl. No. 16/950,773, filed Nov. 17, 2020, Sungdeuk Park, Samsung Electronics Co., Ltd.
U.S. Appl. No. 17/184,970, filed Feb. 25, 2021, Sungdeuk Park, Samsung Electronics Co., Ltd.
U.S. Appl. No. 17/185,384, filed Feb. 25, 2021, Sungdeuk Park, Samsung Electronics Co., Ltd.
U.S. Appl. No. 16/998,908, filed Aug. 20, 2020, Chomin Lee, Samsung Electronics Co., Ltd.
U.S. Appl. No. 17/502,677, filed Oct. 15, 2021, Chomin Lee, Samsung Electronics Co., Ltd.
U.S. Appl. No. 17/480,388, filed Sep. 21, 2021, Chomin Lee, Samsung Electronics Co., Ltd.
U.S. Appl. No. 17/673,439, filed Feb. 16, 2022, Sungdeuk Park, Samsung Electronics Co., Ltd.
U.S. Appl. No. 17/869,089, filed Jul. 20, 2020, Sungdeuk Park, Samsung Electronics Co., Ltd.
U.S. Appl. No. 17/480,854, filed Sep. 21, 2021, Chomin Lee, Samsung Electronics Co., Ltd.
U.S. Appl. No. 17/474,576, filed Sep. 14, 2021, Chomin Lee, Samsung Electronics Co., Ltd.
U.S. Appl. No. 17/474,594, filed Sep. 14, 2021, Chomin Lee, Samsung Electronics Co., Ltd.
U.S. Appl. No. 18/232,997, filed Aug. 11, 2023, Chomin Lee, Samsung Electronics Co., Ltd.
Office Action dated Feb. 29, 2024, in U.S. Appl. No. 18/232,997.
Notice of Allowance dated Nov. 22, 2024, in U.S. Appl. No. 18/437,957.
Office Action dated Sep. 17, 2024 issued in Mexican Application No. MX/a/2021/001869.
Office Action dated Oct. 30, 2024 issued in Chinese Application No. 202210512108.3.
Office Action dated Nov. 5, 2024 issued in Chinese Application No. 202211336881.5.
Office Action dated Nov. 6, 2024 issued in Chinese Application No. 202211045143.5.

(56) References Cited

OTHER PUBLICATIONS

European Search Report dated Nov. 6, 2024 issued in European Application No. EP 24 19 4454.
Office Action dated Nov. 14, 2024 issued in Chinese Application No. 202211336189.2.
Notice of Allowance dated Dec. 26, 2024, in U.S. Appl. No. 18/232,997.
Office Action dated Nov. 30, 2024 issued in Chinese Application No. 202211336118.2.
Office Action dated Dec. 12, 2024 issued in European Application No. 20 208 034.7.
Office Action dated Dec. 19, 2024 issued in Chinese Application No. 202210122022.X.

* cited by examiner

REFRIGERATOR AND HOME APPLIANCE

CROSS-REFERENCE TO RELATED APPLICATIONS

This application is a continuation of U.S. Ser. No. 17/953,005, filed Sep. 26, 2022, which is a continuation of U.S. Ser. No. 16/998,908, filed Aug. 20, 2020, and is based on and claims priority under 35 U.S.C. § 119 to Korean Patent Application Nos. 10-2019-0101998, filed on Aug. 20, 2019, and 10-2020-0063401, filed on May 27, 2020, in the Korean Intellectual Property Office, the disclosures of which are incorporated by reference herein in their entireties.

BACKGROUND

1. Field

The disclosure relates to a refrigerator and a home appliance, and more particularly, to a refrigerator and a home appliance with an improved door structure.

2. Description of the Related Art

Generally, a refrigerator is an appliance that keeps food fresh by including a main body provided with a storage compartment therein and a cool air supply system for supplying cool air to the storage compartment. The storage compartment includes a refrigerating chamber that is maintained at temperature of about 0 degrees Celsius to 5 degrees Celsius to keep food refrigerated, and a freezing chamber that is maintained at temperature of about 0 degrees Celsius to −30 degrees Celsius to keep food frozen. Generally, the storage compartment is provided to have an open front side for putting in and out of food, and the open front side of the storage compartment is opened and closed by a door.

Refrigerators may be classified into several types depending on the type of storage compartment and door. Specifically, refrigerators may be classified into a top mounted freezer (TMP) type refrigerator in which a freezing chamber is formed at an upper side thereof and a refrigerating chamber is formed at a lower side thereof by vertically partitioning a storage compartment using a horizontal partition wall, and a bottom mounted freezer (BMF) type refrigerator in which a refrigerating chamber is formed at an upper side thereof and a freezing chamber is formed at a lower side thereof by vertically partitioning a storage compartment using a horizontal partition wall. In addition, there are a side by side (SBS) type refrigerator in which a freezing chamber is formed at one side thereof and a refrigerating chamber is formed at the other side thereof by horizontally partitioning a storage compartment using a vertical partition wall, and a French door refrigerator (FDR) in which a refrigerating chamber is formed at an upper side thereof and a freezing chamber is formed at a lower side thereof by vertically partitioning a storage compartment using a horizontal partition wall and the refrigerating chamber formed at the upper side is opened and closed by a pair of doors.

SUMMARY

It is an aspect of the disclosure to provide a refrigerator and a home appliance capable of easily changing the design of a door.

It is another aspect of the disclosure to provide a refrigerator and a home appliance capable of preventing an edge of a door panel from being separated from a door body when the door panel is fixed to the door body.

Additional aspects of the disclosure will be set forth in part in the description which follows and, in part, will be obvious from the description, or may be learned by practice of the disclosure.

In accordance with an aspect of the disclosure, a refrigerator includes a main body forming a storage compartment, and a door configured to open and close the storage compartment, wherein the door includes a door body rotatably coupled to the main body and including an insulator therein, a panel body positioned in a front of the door body, a first trim disposed at a first edge of the panel body and configured to be coupled to the door body while being rotated with respect to the door body, and a second trim disposed at a second edge opposite to the first edge of the panel body and configured to be coupled to the door body when the first trim is coupled to the door body.

The door may further include a fixing member coupled to the second trim and the door body, the fixing member configured to fix the second trim with respect to the door body when the second trim is coupled to the door body.

The door body may include a mounting space formed to allow the first trim to be rotated when the first trim is coupled to the door body.

The first trim may include a first trim groove, and the door body may include a cap protrusion formed to be inserted into the first trim groove and configured to support the first trim to restrict movement of the first trim in a front-rear direction when the first trim is coupled to the door body.

The first trim may further include a first trim body fixed to the panel body, a first trim protrusion protruding to be spaced apart from the first trim body to form the first trim groove, and a first trim cut-out portion formed to separate the first trim protrusion into a plurality of portions.

The second trim may include a second trim body fixed to the panel body, a second trim protrusion extending from the second trim body and configured to be coupled to the door body, and a second trim cut-out portion formed to separate the second trim protrusion into a plurality of portions.

The door may further include a third trim disposed on a third edge perpendicular to the first edge and the second edge of the panel body and configured to be fixed to the door body when the first trim is coupled to the door body.

The third trim may include a third trim body fixed to the panel body, a third trim protrusion extending from the third trim body to be coupled to the door body, and a third trim cut-out portion formed to separate the third trim protrusion into a plurality of portions.

The third trim may include a magnetic body.

The third trim may include a third trim body fixed to the panel body, and a third trim protrusion including a material more flexible than a material of the third trim body and configured to be coupled to the door body.

The third trim may include a third trim body fixed to the panel body, a third trim protrusion protruding from the third trim toward the door body, and a third trim cover including a material more flexible than a material of the third trim body and a material of the third trim protrusion, and the third trim cover configured to cover an outer side of the third trim protrusion.

The third trim may include a third trim protrusion having a portion protruding toward the door body, and the door body may include a chassis fixing portion configured to support the third trim protrusion in a direction in which the panel body is coupled to the door body.

One of the third trim protrusion and the chassis fixing portion may include a material having elasticity to be deformable when the third trim is coupled to the door body.

The door may further include a buffer member disposed between the panel body and the door body, and the buffer member configured to absorb an impact applied to the panel body.

The door body may include a chassis forming left and right sides of the door, a lower door cap forming a lower surface of the door and configured to be coupled to the first trim, an upper door cap forming an upper surface of the door and configured to be coupled to the second trim, a case forming a rear surface of the door, and a cover forming a front surface of the door body and configured to be covered by the panel body.

In accordance with an aspect of the disclosure, a home appliance includes a main body having an open side, and a door configured to open and close the open side of the main body, wherein the door includes a door body rotatably coupled to the main body, a panel body positioned in a front of the door body, a first trim disposed at a lower end of the panel body and configured to be coupled to the door body while being rotated with respect to the door body, a second trim disposed at an upper end of the panel body and configured to be coupled to the door body when the first trim is coupled to the door body, and a third trim disposed at left and right ends of the panel body, respectively, and configured to be fixed to the door body when the first trim is coupled to the door body.

The first trim may include a first trim body fixed to the panel body, a first trim protrusion protruding from the first trim body, and a first trim cut-out portion formed to separate the first trim protrusion into a plurality of portions.

The first trim may further include a first trim groove formed between the first trim body and the first trim protrusion, and the door body may include a cap protrusion formed to be inserted into the first trim groove.

The door body may include a mounting space formed to allow the first trim to be rotated when the first trim is coupled to the door body.

The door may further include a fixing member configured to penetrate the door body and the second trim to fix the second trim to the door body when the second trim is coupled to the door body.

Before undertaking the DETAILED DESCRIPTION below, it may be advantageous to set forth definitions of certain words and phrases used throughout this patent document: the terms "include" and "comprise," as well as derivatives thereof mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

In this specification, the terms "front," "rear," "upper," "lower," "left," and "right" are defined with reference to the drawings, and the shape and position of each component are not limited by these terms.

Hereinafter, embodiments of the disclosure will be described in detail with reference to the accompanying drawings.

Figure 1:
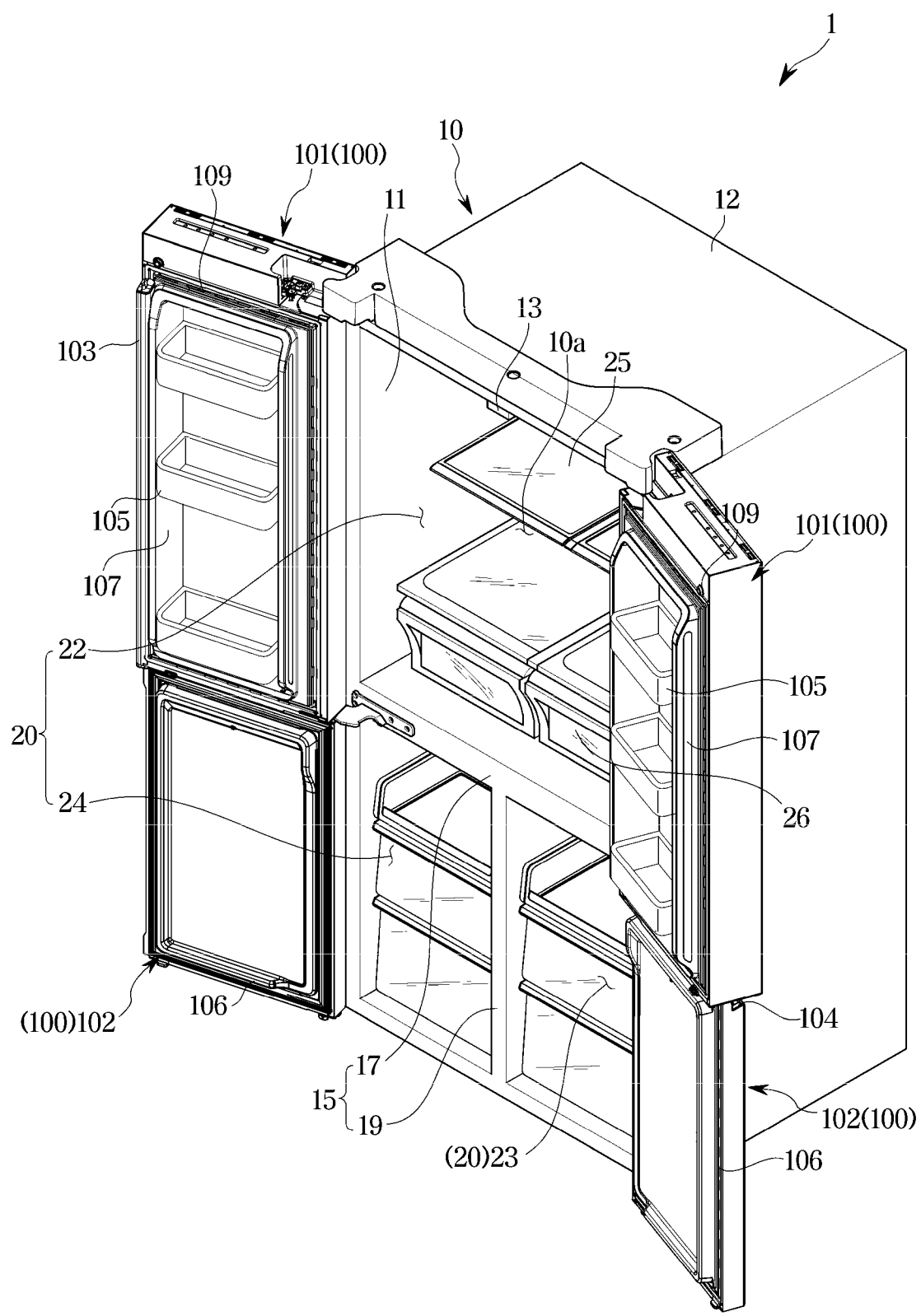
FIG. 1 illustrates a refrigerator according to an embodiment of the disclosure.

FIG. 1 illustrates a refrigerator according to an embodiment of the disclosure.

Referring to FIG. 1, a refrigerator 1 includes a main body 10, a storage compartment 20 formed to be vertically partitioned inside the body 10, a door 100 opening and closing the storage compartment 20, and a cold air supply device supplying cold air to the storage compartment 20.

The main body 10 may include an inner case 11 forming the storage compartment 20, an outer case 12 coupled to an outer side of the inner case 11 to form an appearance, and a main body insulator foamed between the inner case 11 and the outer case 12 to insulate the storage compartment 20.

The cold air supply device may generate cold air using a cold air circulation cycle that compresses, condenses, expands, and evaporates a refrigerant.

The storage compartment 20 may be divided into a plurality of chambers by the partition 15, and a plurality of shelves 25 and storage containers 26 may be provided inside the storage compartment 20 to store food and the like.

The storage compartment 20 may be divided into a plurality of storage chambers 22, 23, 24 by the partition 15, and the partition 15 includes a first partition 17 disposed horizontally inside the storage compartment 20 to divide the storage compartment 20 into an upper storage chamber 22 (or first storage chamber) and lower storage chambers 23 and 24, and a second partition 19 vertically disposed in the lower storage chambers 23 and 24 to divide the lower storage chambers 23 and 24 into a second storage chamber 23 and a third storage chamber 24.

The partition 15 having a T-shape by the combination of the first partition 17 and the second partition 19 may divide the storage compartment 20 into three of spaces. The upper storage chamber 22 among the upper storage chamber 22 and the lower storage chambers 23 and 24 divided by the first partition 17 may be used as a refrigerating chamber, and the lower storage chambers 23 and 24 may be used as freezing chambers.

Both the lower storage chambers 23 and 24 may be used as freezing chambers, but the second storage chamber 23 may be used as a freezing chamber and the third storage chamber 24 may be used as a refrigerating chamber, and the second storage chamber 23 may be used as a freezing chamber and the third storage chamber 24 may be used as both a freezing chamber and a refrigerating chamber.

The division of the storage compartment 20 as described above is exemplified as an example, and each of the storage chambers 22, 23, and 24 may be used differently from the above description.

The storage compartment 20 may be opened and closed by the door 100. The door 100 may include a pair of first doors 101 (or upper doors) opening and closing the upper storage chamber 22, a pair of second doors 102 (or lower doors) opening and closing the lower storage chamber 23 and 24. The pair of first doors 101 and the pair of second doors 102 may open and close an open main body opening 10a of the main body 10.

A rotating bar 103 may be provided on one of the pair of first doors 101. The rotating bar 103 may close a gap between the pair of first doors 101 when the pair of first doors 101 are closed. The main body 10 may be provided with a rotating bar guide 13 to guide the movement of the rotating bar 103.

Hereinafter, only one of the first door 101 and one of the second door 102 will be described for convenience of description, and descriptions of the remaining first door 101 and second door 102 will be omitted. The first doors 101 and the second doors 102 whose description is omitted may have the same configuration as the first doors 101 and the second doors 102, respectively, which will be described below, except that the respective first doors 101 and second doors 102 are provided in a mutual mirror symmetry. Also, the same configuration as that of the first door 101 may be applied to the second door 102, and a detailed description of the configuration of the second door 102, which is the same as the configuration of the first door 101, may be omitted.

The upper storage chamber 22 may be opened and closed by the first door 101 rotatably coupled to the main body 10. The first door 101 may be opened and closed through a first door handle 138 (see FIG. 7). The first door handle 138 may be formed by being recessed on a bottom surface of the first door 101.

A door shelf 105 for storing food may be provided on a rear surface of the first door 101. The door shelf 105 may include a shelf support 107 extending vertically from the first door 101 to support the door shelf 105 on the left and right sides of the door shelf 105. The shelf support 107 may be separately configured to be detachably coupled to the first door 101, and in the present embodiment, the shelf support 107 protrudes rearward from the rear surface of the first door 101 to extend in the vertical direction.

A first gasket 109 may be provided on an edge of the rear surface of the first door 101 to seal a gap with the main body 10 when the first door 101 is closed. The first gasket 109 may be installed in a loop shape along the edge of the rear surface of the first door 101, and a first magnet may be provided therein.

The lower storage chambers 23 and 24 may be opened and closed by the second door 102 rotatably coupled to the main body 10. The second door 102 may be opened and closed through a second door handle 104. The second door handle 104 may be formed by being recessed on an upper surface of the second door 102. The second door 102 may be provided in a sliding manner.

A second gasket 106 may be provided on an edge of a rear surface of the second door 102 to seal a gap with the main body 10 when the second door 102 is closed. The second gasket 106 may be installed in a loop shape along the edge of the rear surface of the second door 102, and a second magnet may be provided therein.

Figure 2:
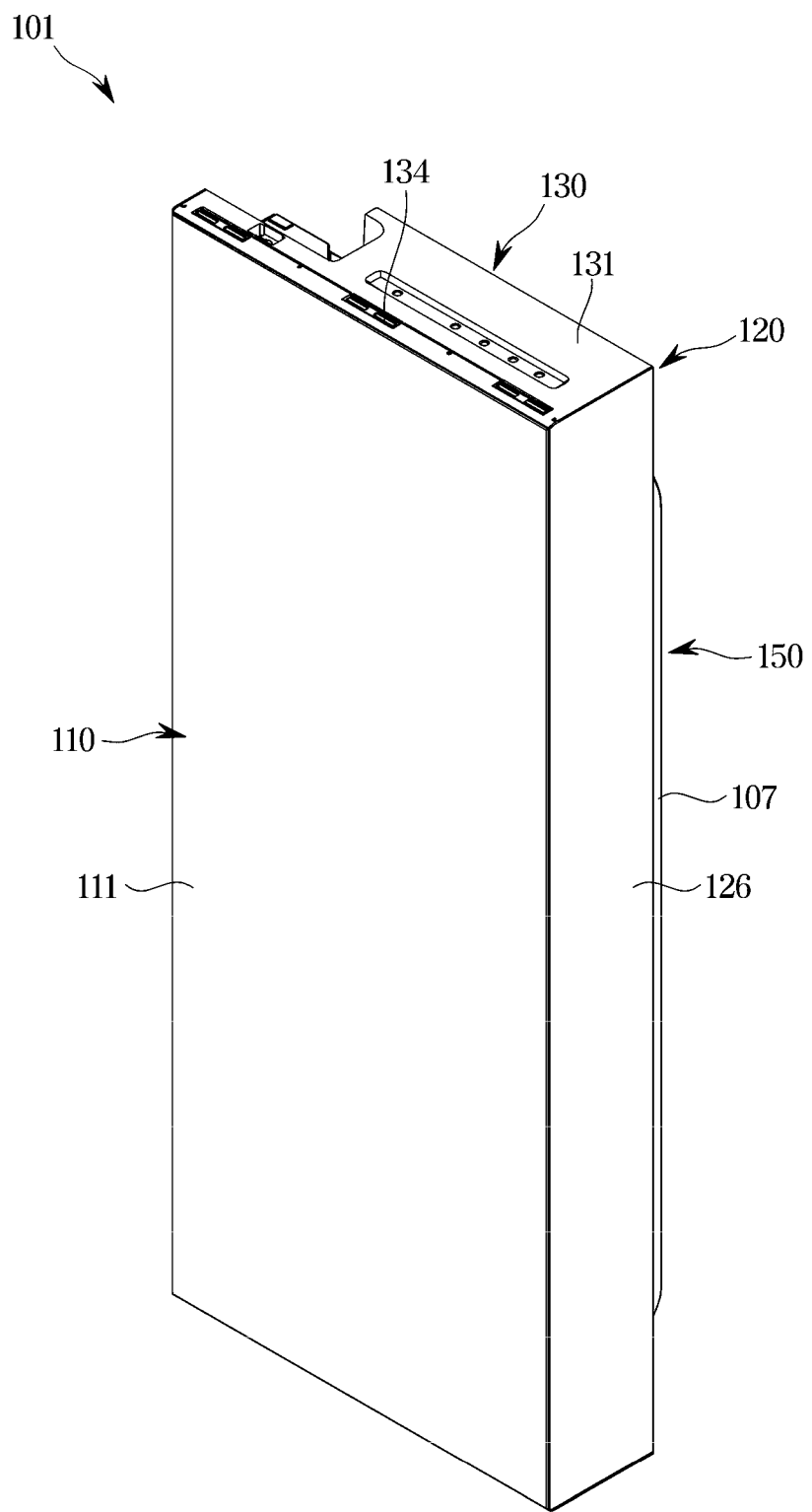
FIG. 2 illustrates a first door illustrated in FIG. 1.
Figure 3:
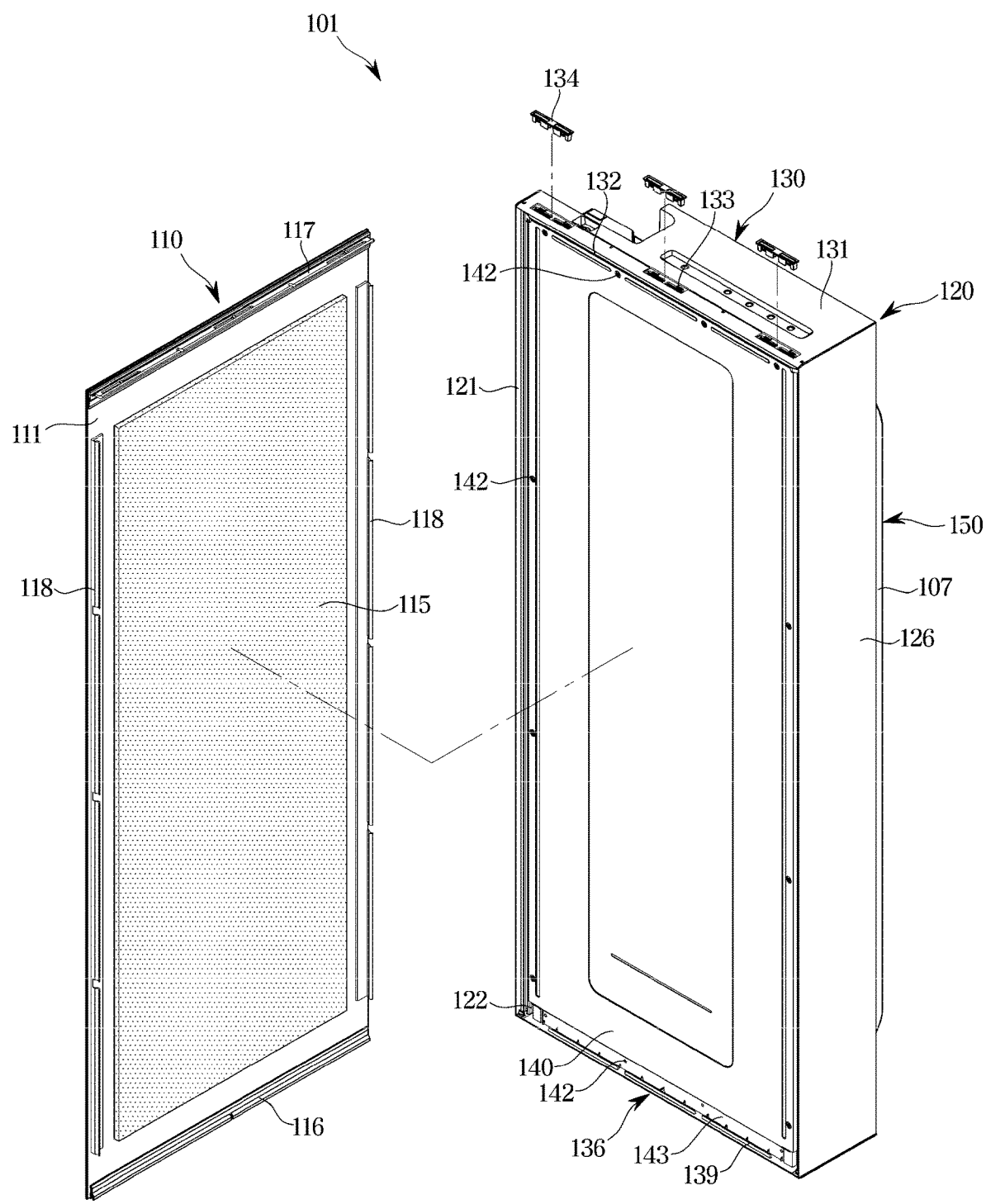
FIG. 3 illustrates a state in which a door panel of the first door illustrated in FIG. 2 is separated from a door body.
Figure 4:
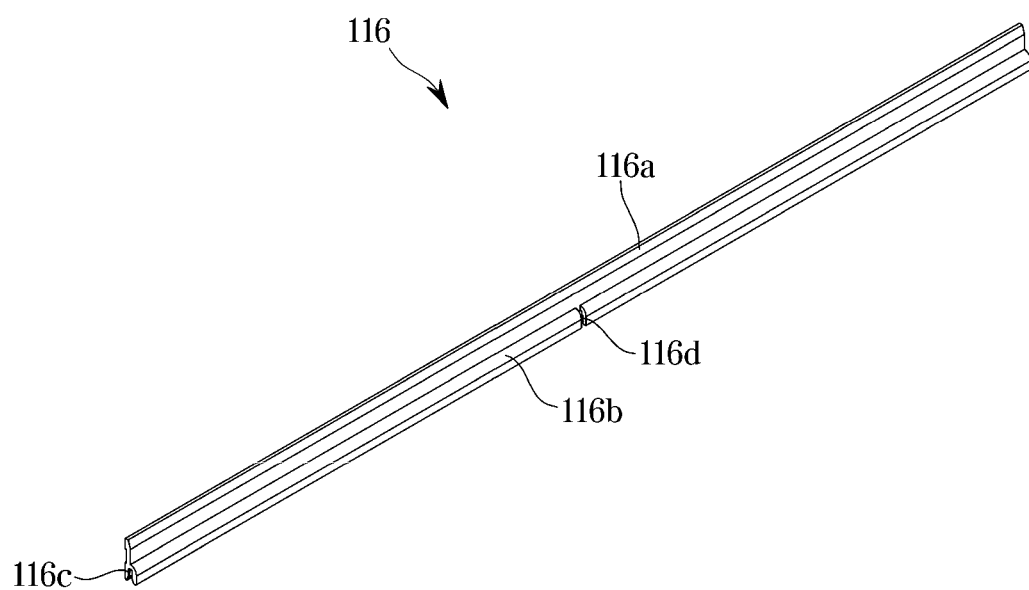
FIG. 4 illustrates a lower trim illustrated in FIG. 3.
Figure 5:
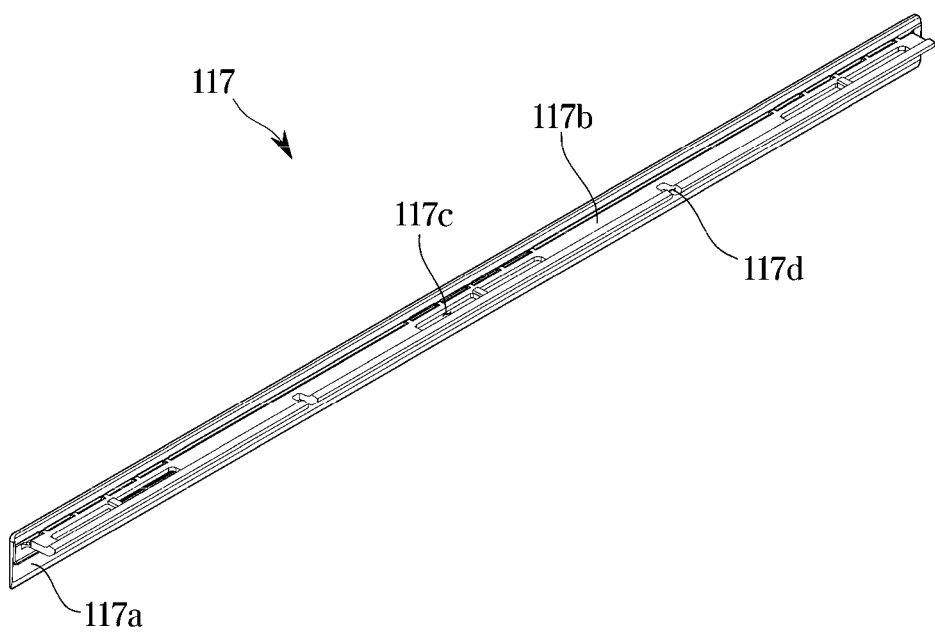
FIG. 5 illustrates an upper trim illustrated in FIG. 3.
Figure 6:
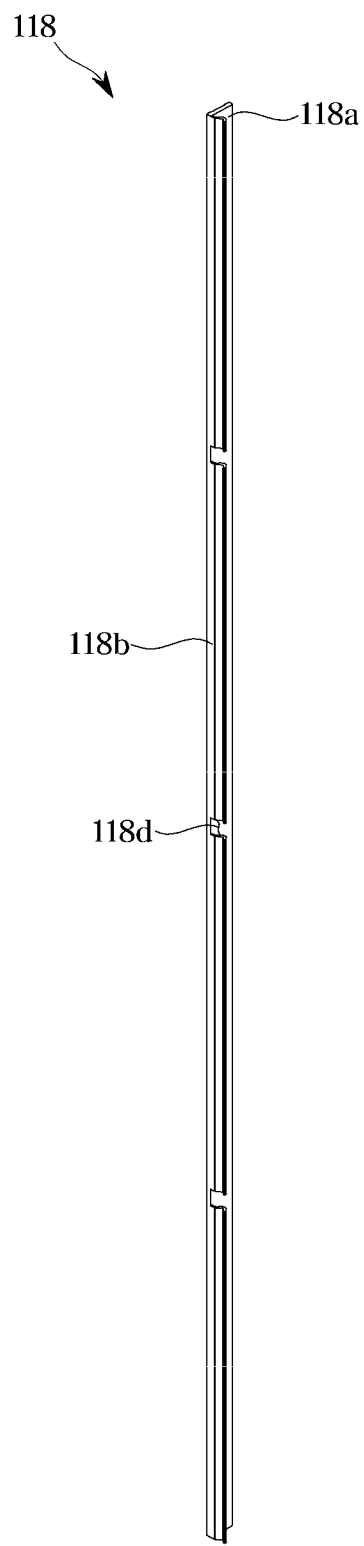
FIG. 6 illustrates a side trim illustrated in FIG. 3.
Figure 7:
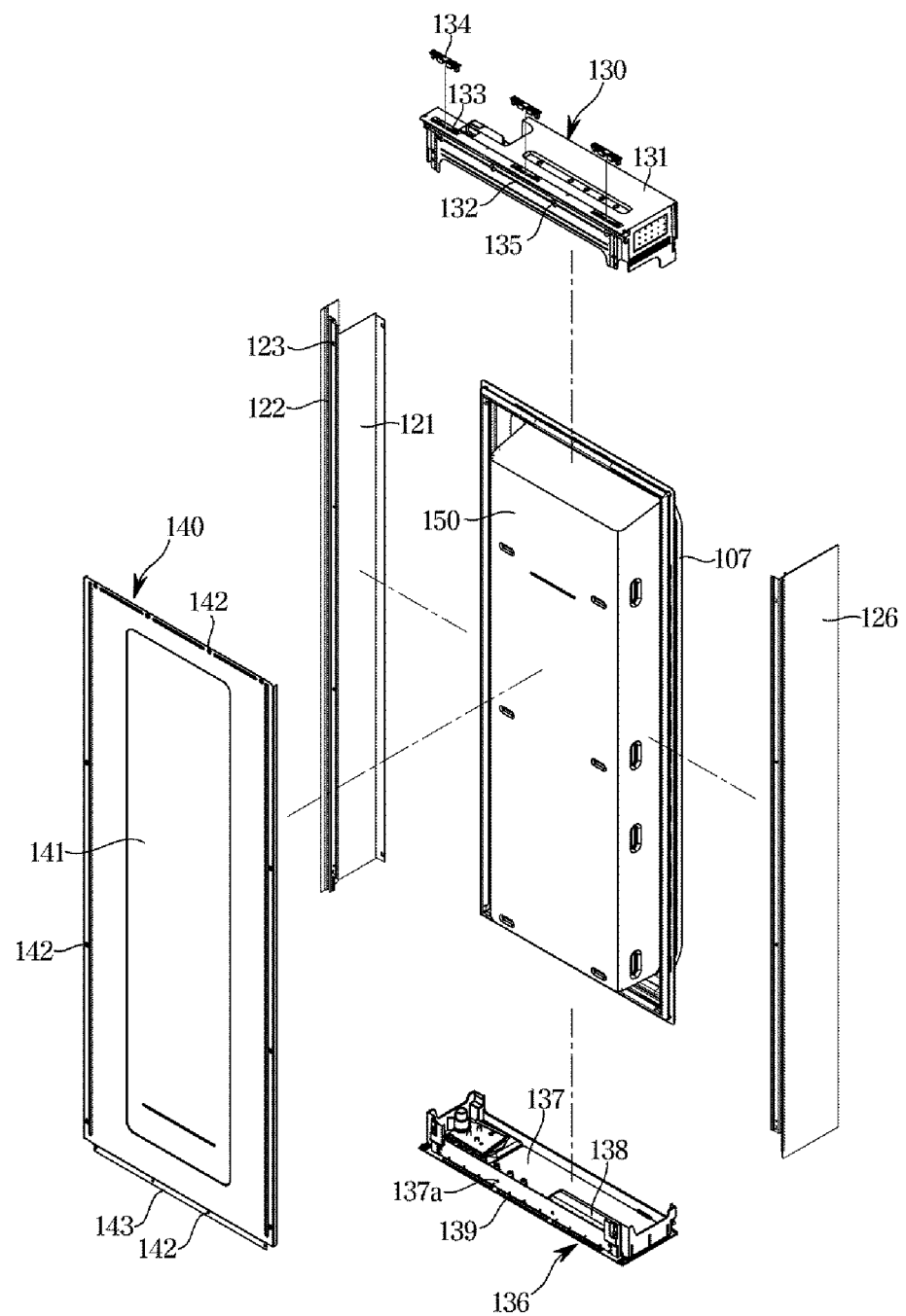
FIG. 7 is an exploded perspective view of a door body illustrated in FIG. 3.
Figure 8:
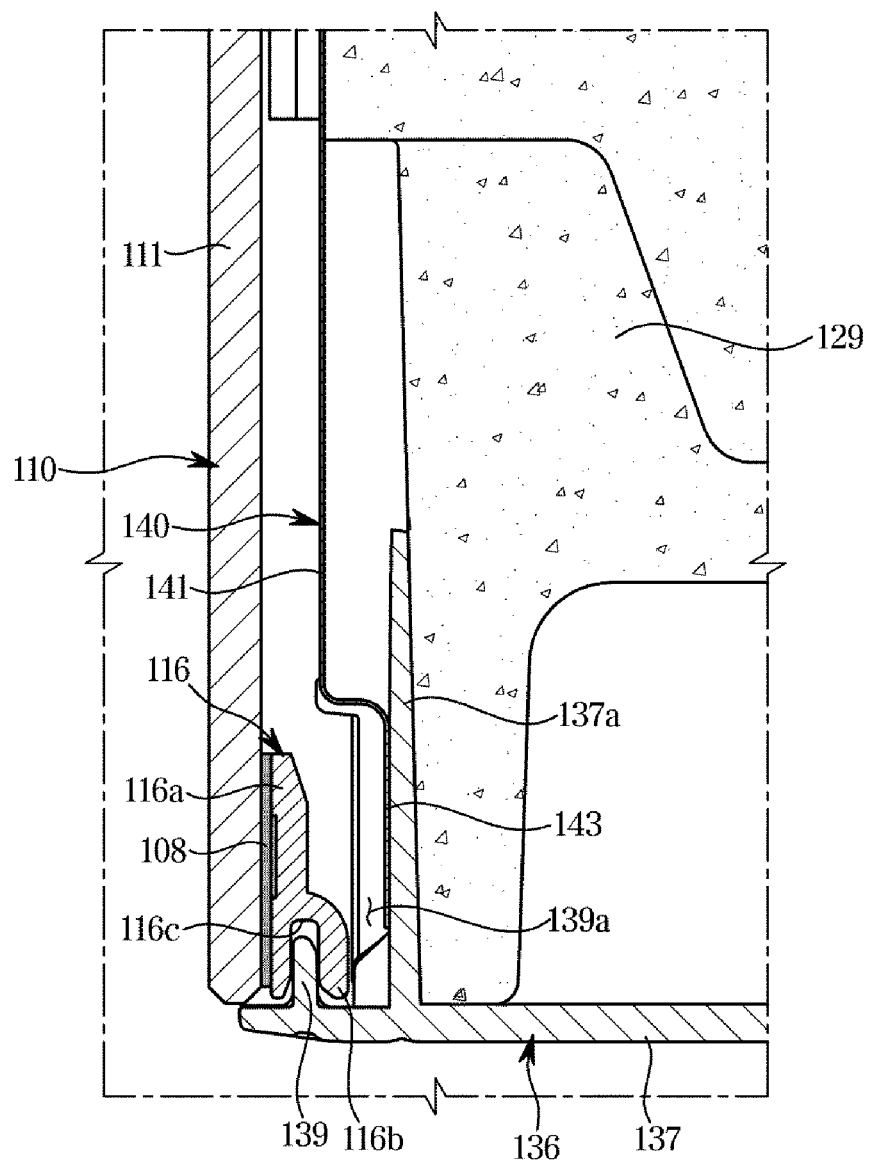
FIG. 8 is a cross-sectional view illustrating a state in which the lower trim illustrated in FIG. 3 is coupled to the door body.
Figure 9:
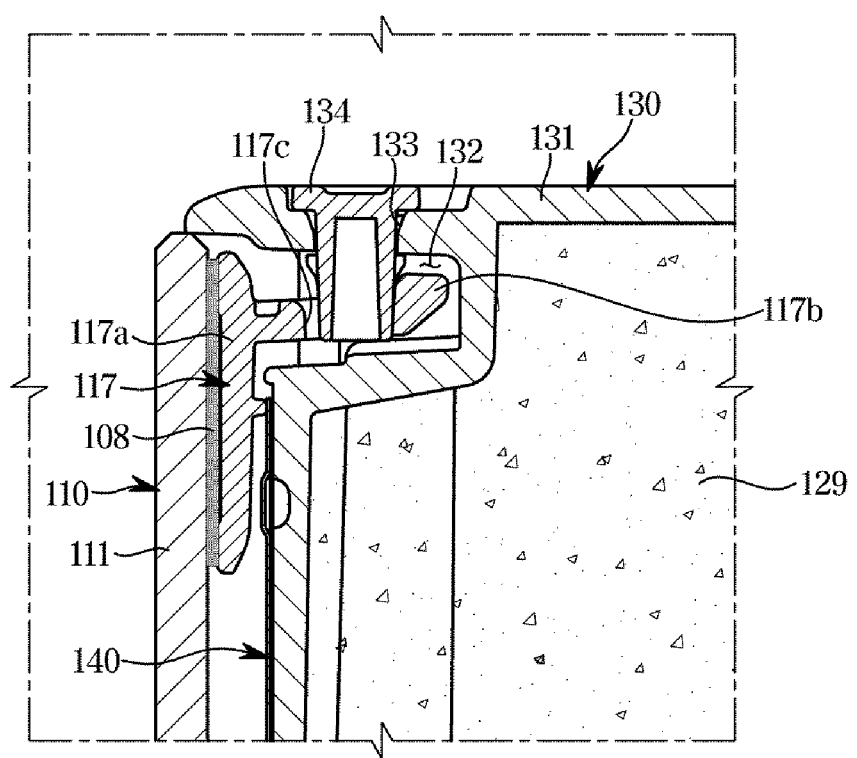
FIG. 9 is a cross-sectional view illustrating a state in which the upper trim illustrated in FIG. 3 is coupled to the door body.
Figure 10:
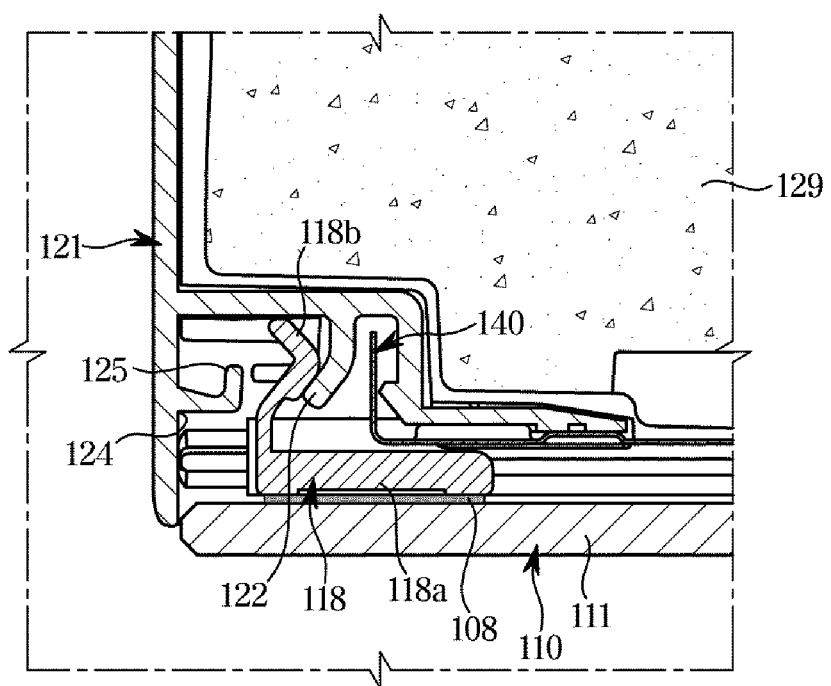
FIG. 10 is a cross-sectional view illustrating a state in which the side trim illustrated in FIG. 3 is coupled to the door body.

FIG. 2 illustrates a first door illustrated in FIG. 1. FIG. 3 illustrates a state in which a door panel of the first door illustrated in FIG. 2 is separated from a door body. FIG. 4 illustrates a lower trim illustrated in FIG. 3. FIG. 5 illustrates an upper trim illustrated in FIG. 3. FIG. 6 illustrates a side trim illustrated in FIG. 3. FIG. 7 is an exploded perspective view of a door body illustrated in FIG. 3. FIG. 8 is a cross-sectional view illustrating a state in which the lower trim illustrated in FIG. 3 is coupled to the door body. FIG. 9 is a cross-sectional view illustrating a state in which the upper trim illustrated in FIG. 3 is coupled to the door body. FIG. 10 is a cross-sectional view illustrating a state in which the side trim illustrated in FIG. 3 is coupled to the door body.

Referring to FIGS. 2 and 3, the first door 101 may include a door panel 110 and a door body 120. The door panel 110 may be detachably coupled to the door body 120.

Referring to FIG. 3, the door panel 110 may include a panel body 111, a buffer member 115, and fixing trims 116, 117, and 118.

The panel body 111 may form an outer shape of the first door 101. The panel body 111 may have a flat plate shape. Various designs may be provided on a front surface of the panel body 111 to meet the needs of users. The fixing trims 116, 117, and 118 for coupling with the door body 120 may be disposed on a rear surface of the panel body 111.

The panel body 111 may have a thickness of a predetermined size or more. The panel body 111 illustrated in FIGS. 8 to 10 may include glass. When the panel body 111 has a thickness greater than or equal to the predetermined size, an end of the panel body 111 may be finished not to be sharp.

The buffer member 115 may be disposed on the rear surface of the panel body 111. The buffer member 115 may be disposed in a space formed between the door panel 110 and the door body 120. The buffer member 115 may be configured to prevent an impact from being transmitted to the door body 120 when the impact is applied to the door panel 110. Also, the buffer member 115 may be configured to absorb noise that may be generated in the door panel 110. The buffer member 115 may include expanded polystyrene.

Referring to FIGS. 3 to 6, the fixing trims 116, 117, and 118 may include the lower trim 116, the upper trim 117, and the side trim 118. The fixing trims 116, 117, and 118 may be attached to the panel body 111 through an adhesive 108 (see FIGS. 8 to 10). The fixing trims 116, 117, and 118 may be adhered to the panel body 111 by a poly urethane reactive (PUR) adhesion method. However, the fixing method of the fixing trims 116, 117, and 118 is not limited thereto. By the fixing trims 116, 117 and 118, the door panel 110 may be securely coupled to the door body 120 and may be easily detached from the door body 120.

Specifically, referring to FIGS. 4 and 8, the lower trim 116 includes a lower trim body 116a, a lower trim protrusion 116b, a lower trim groove 116c, and a lower trim cut-out portion 116d. The lower trim 116 may be referred to as the first trim 116. The lower trim 116 may be disposed on a lower edge of the panel body 111.

The lower trim body 116a may extend in a substantially horizontal direction to be fixed to a lower end of the panel body 111. The lower trim body 116a may have a substantially rectangular plate shape. The lower trim body 116a may be fixed to the panel body 111 through the adhesive 108.

The lower trim protrusion 116b may protrude rearward from the lower trim body 116a. The lower trim protrusion 116b may be provided such that the lower trim groove 116c is formed, together with the lower trim body 116a. The lower trim protrusion 116b may be formed to extend rearward by a predetermined length from the lower trim body 116a and then extend in a substantially vertical direction.

The lower trim groove 116c may be formed between the lower trim protrusion 116b and the lower trim body 116a. The lower trim groove 116c may accommodate a lower cap protrusion 139 of a lower door cap 136. The lower trim groove 116c may be provided to correspond to a size and/or shape of the lower cap protrusion 139. As the lower cap protrusion 139 is inserted into the lower trim groove 116c, the lower end of the panel body 111 may be fixed to the door body 120.

The lower trim cut-out portion 116d may be formed at the lower trim protrusion 116b. The lower trim cut-out portion 116d may be provided to separate the lower trim protrusion 116b into a plurality of portions. The portions of the lower trim protrusion 116b separated by the lower trim cut-out portion 116d may be disposed to be spaced apart from each other along a direction in which the lower trim protrusion 116b extends. FIG. 4 illustrates that one of the lower trim cut-out portion 116d is provided, the number of the lower trim cut-out portions 116d is not limited thereto. As the lower trim cut-out portion 116d separates the lower trim protrusion 116b into a plurality of portions, when the panel body 111 is deformed by heat, the lower trim 116 may be prevented from being damaged by a deformation force applied to the lower trim 116.

Referring to FIGS. 5 and 9, the upper trim 117 may include an upper trim body 117a, an upper trim protrusion 117b, and an upper trim hole 117c. The upper trim 117 may be referred to as the second trim 117. The upper trim 117 may be disposed on an upper edge of the panel body 111.

The upper trim body 117a may extend in a substantially horizontal direction to be fixed to an upper end of the panel body 111. The upper trim body 117a may have a substantially rectangular plate shape. The upper trim body 117a may be fixed to the panel body 111 through the adhesive 108.

The upper trim protrusion 117b may protrude rearward from the upper trim body 117a. The upper trim protrusion 117b may be provided to be inserted into an upper coupling groove 132 of an upper door cap 130. The upper trim protrusion 117b may be fixed by a fixing member 134 in a state of being inserted into the upper coupling groove 132.

The upper trim hole 117c may be formed on the upper trim protrusion 117b. The upper trim hole 117c may be provided to allow the fixing member 134 to be inserted. The upper trim hole 117c may be formed to substantially vertically penetrate the upper trim protrusion 117b. As the fixing member 134 is inserted into the upper trim hole 117c in a state in which the upper trim protrusion 117b is inserted into the upper coupling groove 132, the upper end of the panel body 111 may be fixed to the door body 120.

An upper trim cut-out portion 117d may be formed at the upper trim protrusion 117b. The upper trim cut-out portion 117d may be provided to separate the upper trim protrusion 117b into a plurality of portions. The portions of the upper trim protrusion 117b separated by the upper trim cut-out portion 117d may be disposed to be spaced apart from each other along a direction in which the upper trim protrusion 117b extends. FIG. 5 illustrates that two of the upper trim cut-out portions 117d are provided, the number of the upper trim cut-out portions 117d is not limited thereto. As the upper trim cut-out portion 117d separates the upper trim protrusion 117b into a plurality of portions, when the panel body 111 is deformed by heat, the upper trim 117 may be prevented from being damaged by a deformation force applied to the upper trim 117.

Referring to FIGS. 6 and 10, the side trim 118 may include a side trim body 118a, a side trim protrusion 118b, and a side trim cut-out portion 118d. The side trim 118 may be referred to as the third trim 118. The side trim 118 may be disposed on edges of the left and right sides of the panel body 111.

The side trim body 118a may extend in a substantially vertical direction to be fixed to a left end and a right end of the panel body 111, respectively. The side trim body 118a may have a substantially rectangular plate shape. The side trim body 118a may be fixed to the panel body 111 through the adhesive 108.

The side trim protrusion 118b may protrude rearward from the side trim body 118a. The side trim protrusions 118b may be coupled to chassis fixing portions 122 of chassis 121 and 126, respectively. The side trim protrusion 118b may include a material having a predetermined elasticity so that the side trim protrusion 118b may be restored after being deformed by being pressed by the chassis fixing portion 122 when coupled to the chassis fixing portion 122. The side trim protrusion 118b may be provided such that an elastic force is generated in a direction of coming into contact with the chassis fixing portion 122 when the side trim 118 is coupled to the door body 120. The side trim protrusion 118b may have a shape in which at least a portion thereof is bent toward the chassis fixing portion 122.

The side trim cut-out portion 118d may be formed at the side trim protrusion 118b. The side trim cut-out portion 118d may be provided to separate the side trim protrusion 118b into a plurality of portions. The portions of the side trim protrusion 118b separated by the side trim cut-out portion 118d may be disposed to be spaced apart from each other along a direction in which the side trim protrusion 118b extends. FIG. 6 illustrates that three of the side trim cut-outportions 118d are provided, the number of the side trim cut-out portions 118d is not limited thereto. As the side trim cut-out portion 118d separates the side trim protrusion 118b into a plurality of portions, when the panel body 111 is deformed by heat, the side trim 118 may be prevented from being damaged by a deformation force applied to the side trim 118.

Referring to FIGS. 3 and 7, the door body 120 may include the chassis 121 and 126, the upper door cap 130, the lower door cap 136, a cover 140, and a case 150.

The chassis 121 and 126 may include a different material from the upper door cap 130 and the lower door cap 136. Specifically, the chassis 121 and 126 may include aluminum. The upper door cap 130 and the lower door cap 136 may include acrylonitrile-butadiene-styrene resin (ABS resin).

The chassis 121 and 126 may include the first chassis 121 forming a left side surface of the first door 101 and the second chassis 126 forming a right side surface of the first door 101. The chassis 121 and 126 may extend in the vertical direction. Hereinafter, only the first chassis 121 will be described for convenience of description, and the same structure as the first chassis 121 may be applied to the second chassis 126.

Referring to FIGS. 7 and 10, the first chassis 121 may include the chassis fixing portion 122. The chassis fixing portion 122 may be coupled to the side trim protrusion 118b of the side trim 118. The chassis fixing portion 122 may include a portion extending toward the panel body 111 when the door panel 110 is mounted on the door body 120. The chassis fixing portion 122 may include a material having a predetermined elasticity so that the chassis fixing portion 122 may be restored after being deformed by being pressed by the side trim protrusion 118b when coupled to the side trim protrusion 118b. The chassis fixing portion 122 may be provided such that an elastic force is generated in a direction of coming into contact with the side trim 118 when the side trim 118 is coupled to the door body 120. The chassis fixing portion 122 may have a shape in which at least a portion thereof is bent toward the side trim 118.

The first chassis 121 may include a chassis hole 123. The chassis hole 123 may be formed such that a fastening member for coupling with the cover 140 may be coupled thereto. As the cover 140 is aligned with respect to the first chassis 121 so that a cover hole 142 is located at a position corresponding to the chassis hole 123 and then the fastening member is inserted into the cover hole 142 and the chassis hole 123, the cover 140 may be fixed to the first chassis 121.

The upper door cap 130 may be coupled to upper ends of the chassis 121 and 126. The upper door cap 130 may form an upper surface of the first door 101. The upper door cap 130 may include an upper cap body 131.

Referring to FIGS. 7 and 9, the upper coupling groove 132 may be formed on the upper cap body 131. The upper coupling groove 132 may be formed by being recessed on one surface facing the door panel 110. The upper coupling groove 132 may be provided to accommodate a portion of the upper trim 117.

A passing opening 133 may be formed on an upper surface of the upper cap body 131. Specifically, the passing opening 133 may be formed to communicate the upper coupling groove 132 with the outside when the fixing member 134 is not mounted. The fixing member 134 may be inserted into the upper coupling groove 132 through the passing opening 133 and then coupled to the upper trim hole 117c of the upper trim 117. When the insertion of the fixing member 134 is completed, the passing opening 133 may be covered by the fixing member 134. The fixing member 134 may be detachably mounted on the upper cap body 131.

An upper cap hole 135 may be formed on the upper cap body 131. The upper cap hole 135 may be formed such that a fastening member for coupling with the cover 140 may be coupled thereto. As the cover 140 is aligned with respect to the upper door cap 130 so that the cover hole 142 is located at a position corresponding to the upper cap hole 135 and then the fastening member is inserted into the cover hole 142 and the upper cap hole 135, the cover 140 may be fixed to the upper door cap 130.

Referring to FIGS. 7 and 8, the lower door cap 136 may be coupled to lower ends of the chassis 121 and 126. The lower door cap 136 may form the bottom surface of the first door 101. The lower door cap 136 may include a lower cap body 137.

The first door handle 138 may be formed on the lower cap body 137. The first door handle 138 may be formed by being recessed upward from a bottom surface of the lower door cap 136.

The lower cap protrusion 139 may be formed on the lower cap body 137. The lower cap protrusion 139 may protrude upward from a bottom surface of the lower cap body 137. The lower cap protrusion 139 may be provided to be inserted into the lower trim groove 116c of the lower trim 116.

The lower cap body 137 may include an installation guide 137a protruding upward from the bottom surface thereof. The installation guide 137a may be disposed to be spaced apart from the lower cap protrusion 139 by a predetermined distance. The installation guide 137a may guide the lower trim 116 of the door panel 110 to an installation position when the door panel 110 is mounted on the door body 120.

A mounting space 139a may be formed between the installation guide 137a and the lower cap protrusion 139. Through the mounting space 139a, the door panel 110 may be rotated such that the lower cap protrusion 139 is inserted into the lower trim groove 116c in a state in which a lower end of the door panel 110 is positioned adjacent to the lower cap protrusion 139. Accordingly, the door panel 110 may be fixed to the door body 120.

A lower cap hole 137aa may be formed on the lower cap body 137. The lower cap hole 137aa may be formed such that a fastening member for coupling with the cover 140 may be coupled thereto. As the cover 140 is aligned with respect to the lower door cap 136 so that the cover hole 142 is located at a position corresponding to the lower cap hole 137aa and then the fastening member is inserted into the cover hole 142 and the lower cap hole 137aa, the cover 140 may be fixed to the lower door cap 136.

The chassis 121 and 126, the upper door cap 130, and the lower door cap 136 may form upper, lower, left, and right surfaces of the first door 101. The chassis 121 and 126, the upper door cap 130, and the lower door cap 136 may be collectively referred to as a door frame. The door frame may have a shape in which front and rear sides thereof are open. FIG. 7 illustrates that the chassis 121 and 126, the upper door cap 130, and the lower door cap 136 are detachably provided, but the chassis 121 and 126, the upper door cap 130, and the lower door cap 136 may be integrally formed. That is, the door frame may be integrally formed.

The cover 140 may be mounted on the door frame to cover the open front side of the door frame. The cover 140 may include a cover body 141.

The cover body 141 may include the cover holes 142 through which fastening members pass when the cover 140 is coupled to the chassis 121 and 126, the upper door cap 130, and the lower door cap 136. Edges of the cover body 141 may be fixed to the chassis 121 and 126, the upper door cap 130, and the lower door cap 136, respectively, as the fastening members pass through the cover holes 142 and then are coupled to the chassis 121 and 126, the upper door cap 130, and the lower door cap 136, respectively.

A bent portion 143 may be provided at a lower end of the cover body 141. The bent portion 143 may be formed to be bent rearward from the cover body 141. The bent portion 143 may be provided to form a step with the cover body 141. The bent portion 143 may form the mounting space 139a together with the lower cap protrusion 139 and the installation guide 137a. The cover hole 142 for coupling with the lower door cap 136 may be formed on the bent portion 143.

The case 150 may be mounted to the door frame to cover the open rear side of the door frame. The case 150 may include the first shelf support 107 on which the first door shelf 105 is mounted.

Figure 11:
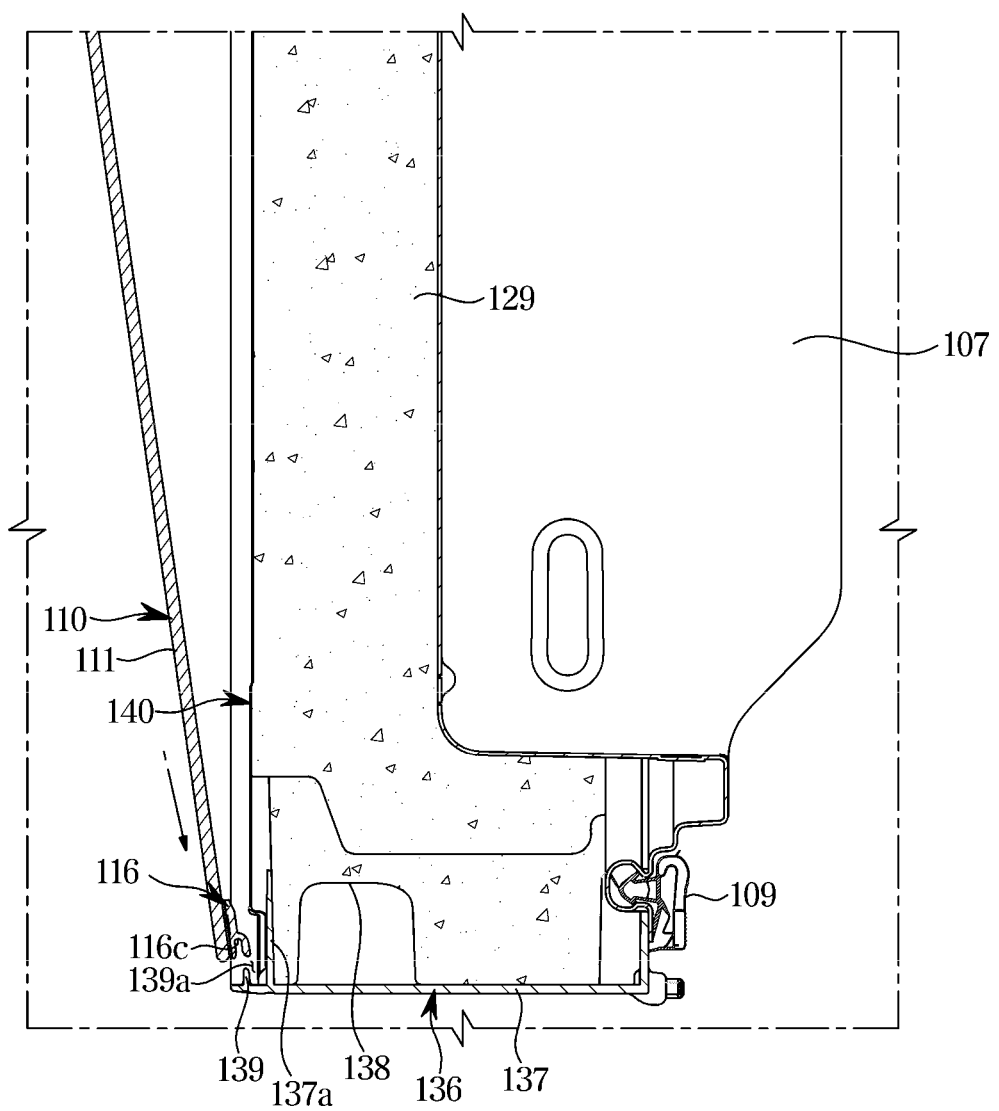
FIG. 11 is a cross-sectional view illustrating a state in which the door panel illustrated in FIG. 3 is coupled to the door body.
Figure 12:
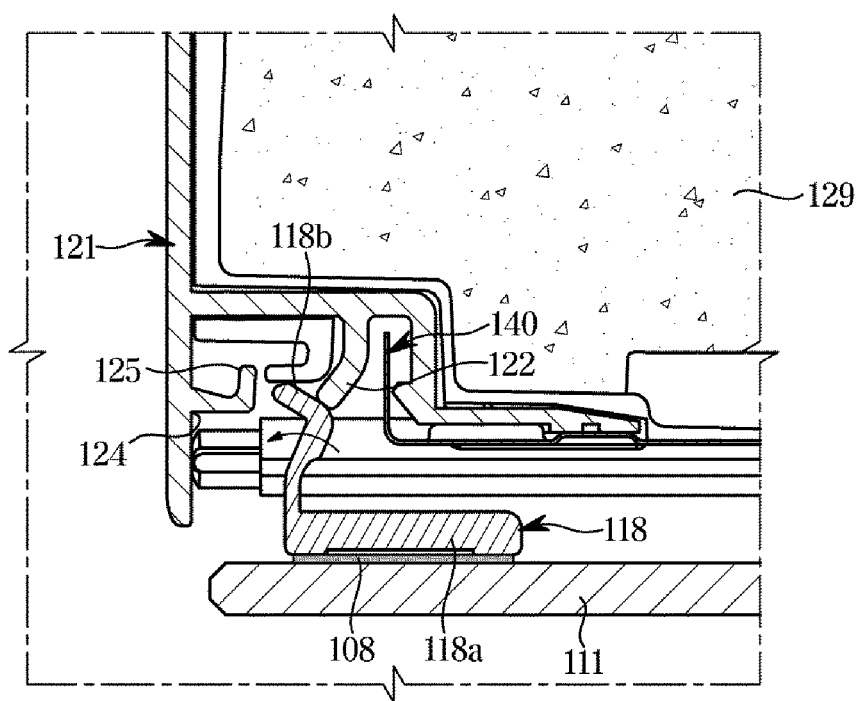
FIG. 12 illustrates a state in which the side trim of the door panel illustrated in FIG. 10 is coupled to a chassis of the door body.
Figure 13:
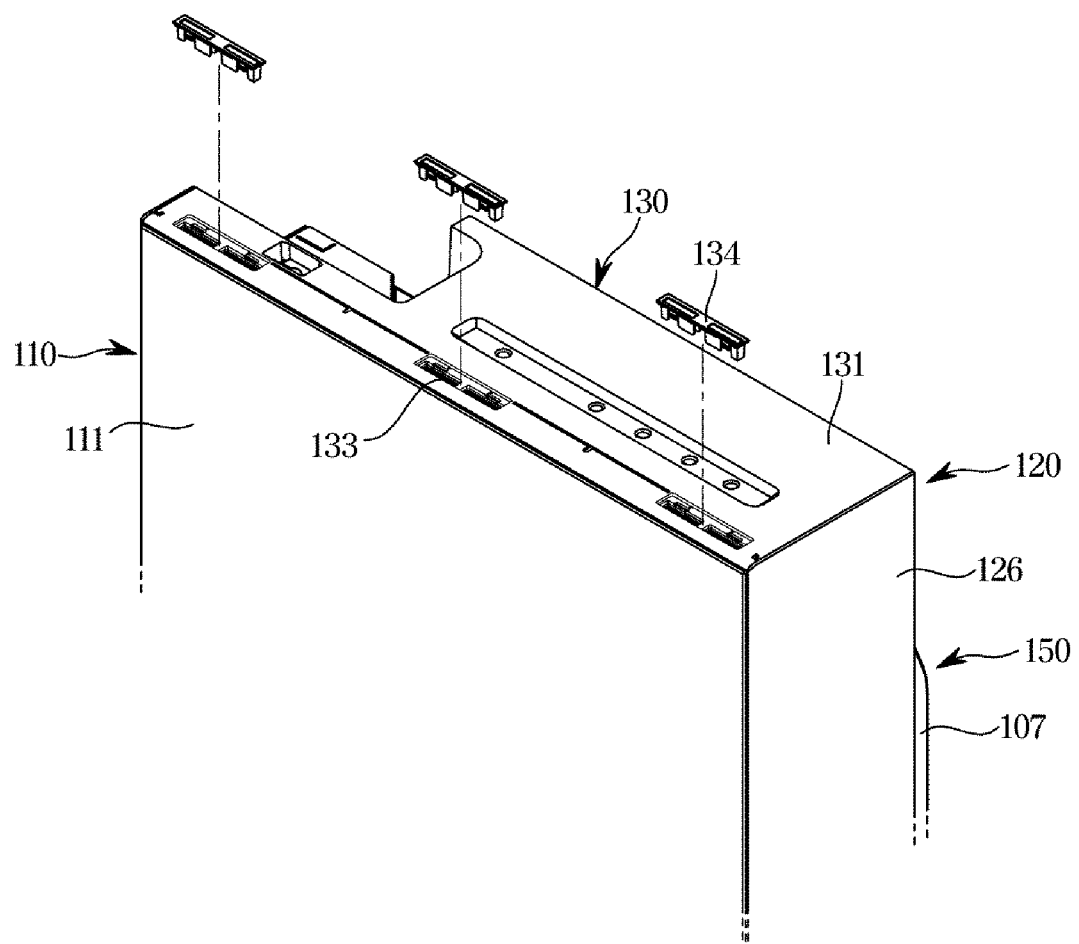
FIG. 13 is a view for explaining a process in which an upper end of the door panel illustrated in FIG. 2 is fixed to the door body.

FIG. 11 is a cross-sectional view illustrating a state in which the door panel illustrated in FIG. 3 is coupled to the door body. FIG. 12 illustrates a state in which the side trim of the door panel illustrated in FIG. 10 is coupled to a chassis of the door body. FIG. 13 is a view for explaining a process in which an upper end of the door panel illustrated in FIG. 2 is fixed to the door body.

A process of assembling the door panel 110 to the door body 120 will be described with reference to FIGS. 11 to 13.

First, the upper door cap 130 and the lower door cap 136 are coupled to the upper and lower ends of the chassis 121 and 126, respectively, to form the door frame. The cover 140 and the case 150 are coupled to the front and rear sides of the door frame, respectively, to form the door body 120. The insulator 129 is foamed inside the door body 120.

Referring to FIG. 11, the door panel 110 may be aligned such that the lower trim 116 faces the lower cap protrusion 139 of the door body 120. The door panel 110 may be positioned to extend toward an upper front from the lower cap protrusion 139. The door panel 110 is rotated in a state in which an end of the lower cap protrusion 139 is aligned to be located at an inlet of the lower trim groove 116c so that the lower cap protrusion 139 may be inserted into the lower trim groove 116c. Based on the direction shown in FIG. 11, the door panel 110 may be rotated clockwise to be firstly coupled to the door body 120 as shown in FIG. 8. As the mounting space 139a is formed in the lower door cap 136, the door panel 110 may be rotated and be coupled with respect to the door body 120.

Referring to FIG. 12, as the door panel 110 is rotated to be coupled to the door body 120, the side trim 118 may be coupled to the chassis 121 and 126. The side trims 118 may be coupled to the chassis 121 and 126 sequentially from the lower side to the upper side. Specifically, the side trims 118 may be coupled to the chassis 121 and 126 while the side trim protrusion 118b and/or the chassis fixing portion 122 is deformed when the side trim protrusion 118b comes into contact with the chassis fixing portion 122. When the side trims 118 are coupled to the chassis 121 and 126, respectively, an elastic force may be applied to the side trim protrusion 118b and the chassis fixing portion 122 in a mutually contacting direction.

Referring to FIG. 13, when the coupling of the side trim 118 is completed, the upper trim protrusion 117b of the upper trim 117 may be inserted into the upper coupling groove 132. When the upper trim protrusion 117b is inserted into the upper coupling groove 132, the fixing member 134 may be inserted into the upper trim hole 117c through the passing opening 133. As the fixing member 134 is coupled to the passing opening 133 and the upper trim hole 117c, the door panel 110 may be fixed to the upper door cap 130.

As the above process is reversed, the door panel 110 may be separated from the door body 120.

Through the above-described process, in the refrigerator 1 according to an embodiment of the disclosure, the door panel 110 may be easily coupled to the door body 120 or may be easily separated from the door body 120.

Figure 14:
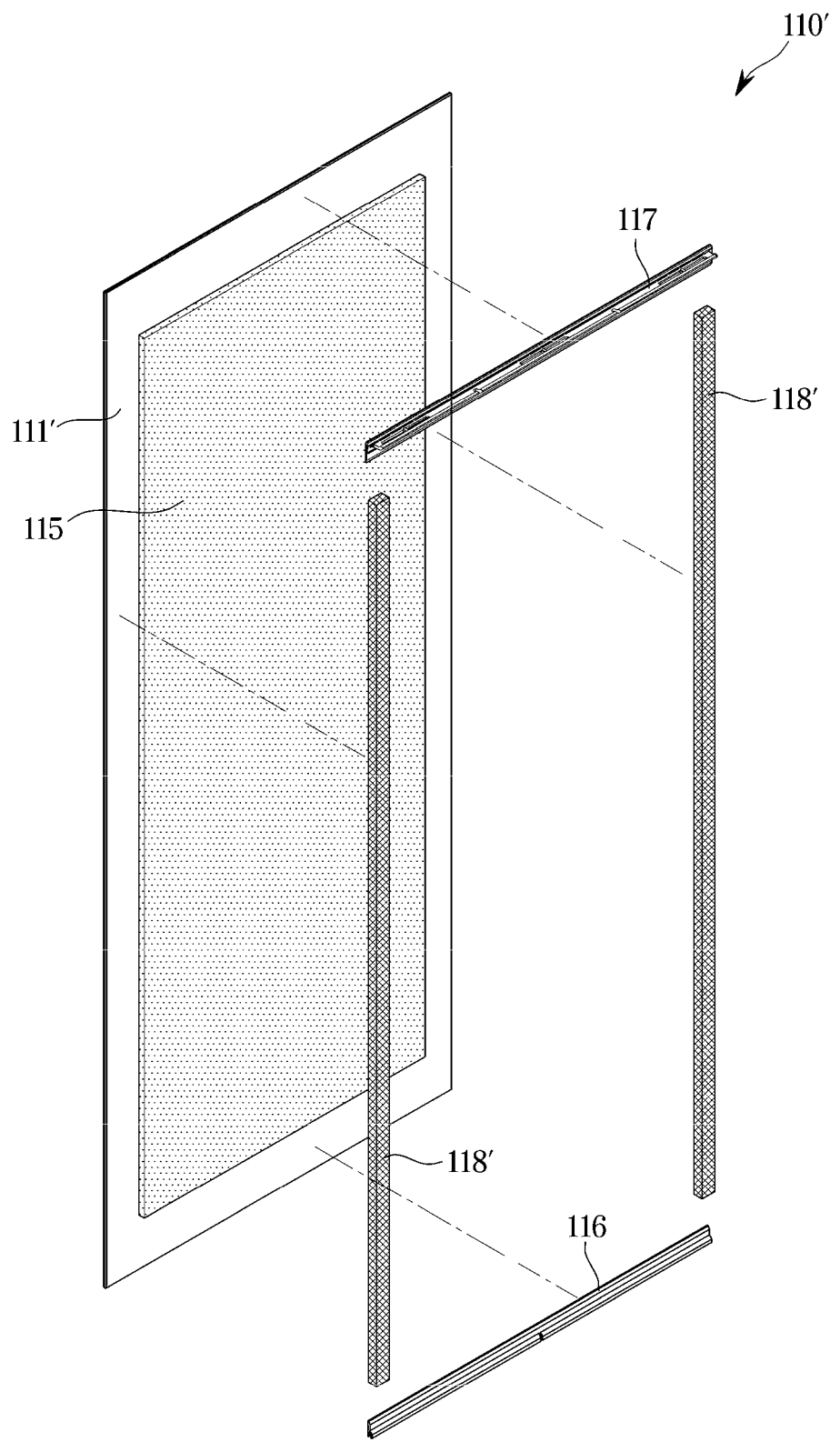
FIG. 14 illustrates an exploded perspective view of a door panel according to another embodiment of the disclosure.
Figure 15:
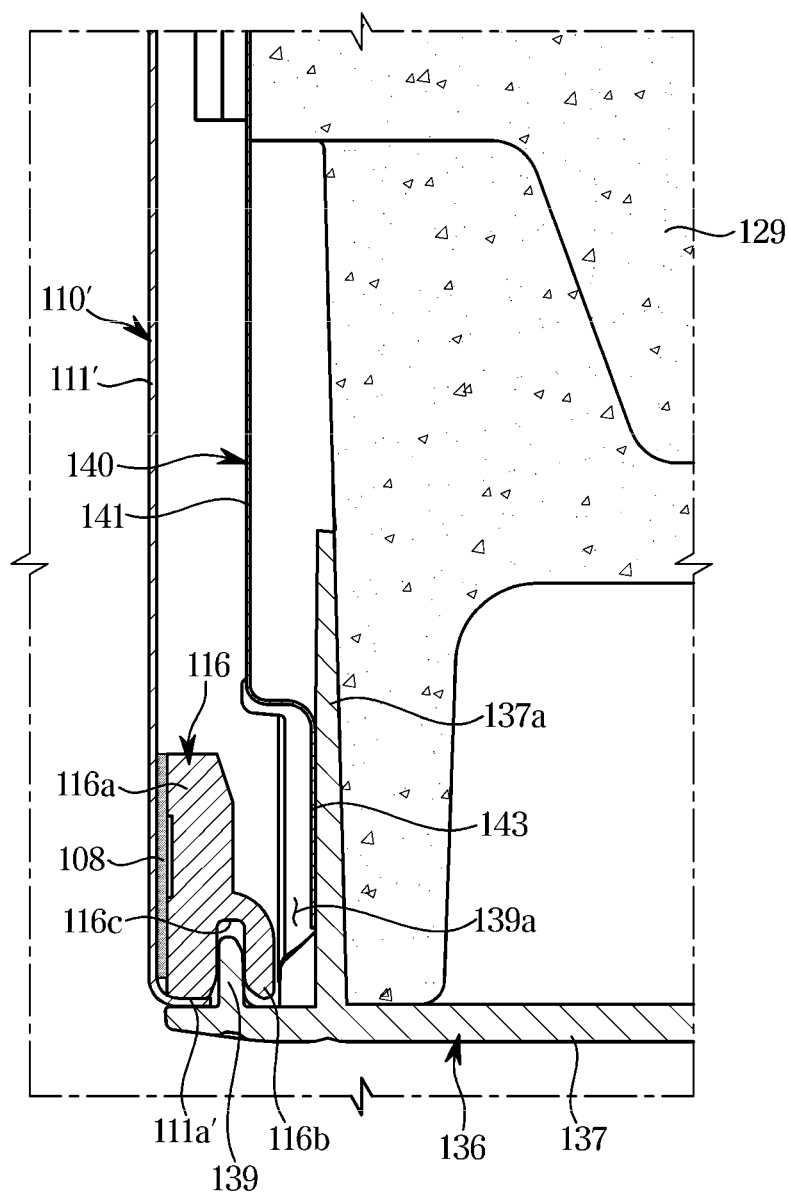
FIG. 15 is a cross-sectional view illustrating a state in which a lower trim illustrated in FIG. 14 is coupled to a door body.
Figure 16:
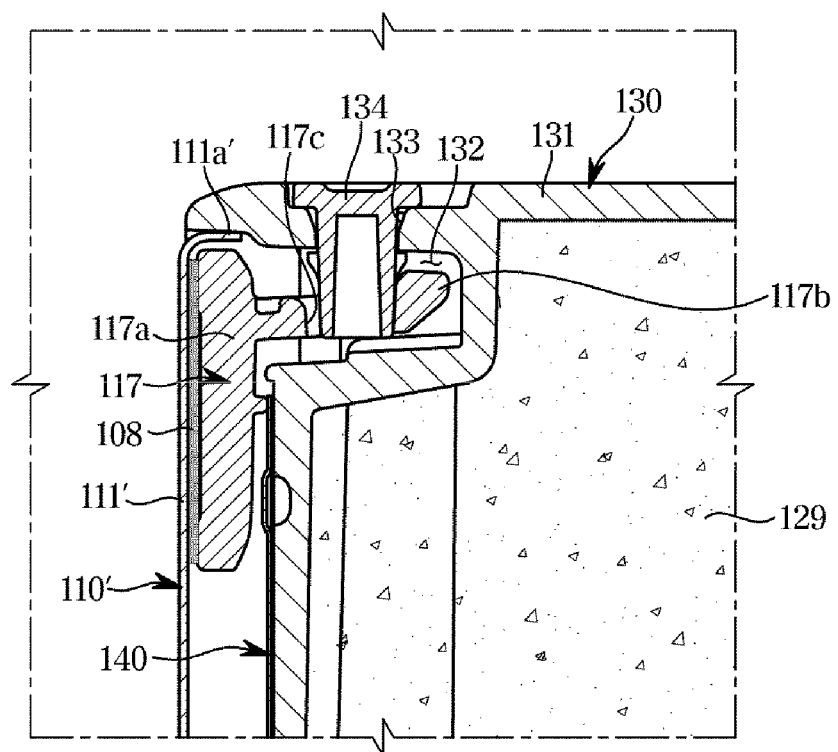
FIG. 16 is a cross-sectional view illustrating a state in which an upper trim illustrated in FIG. 14 is coupled to the door body.
Figure 17:
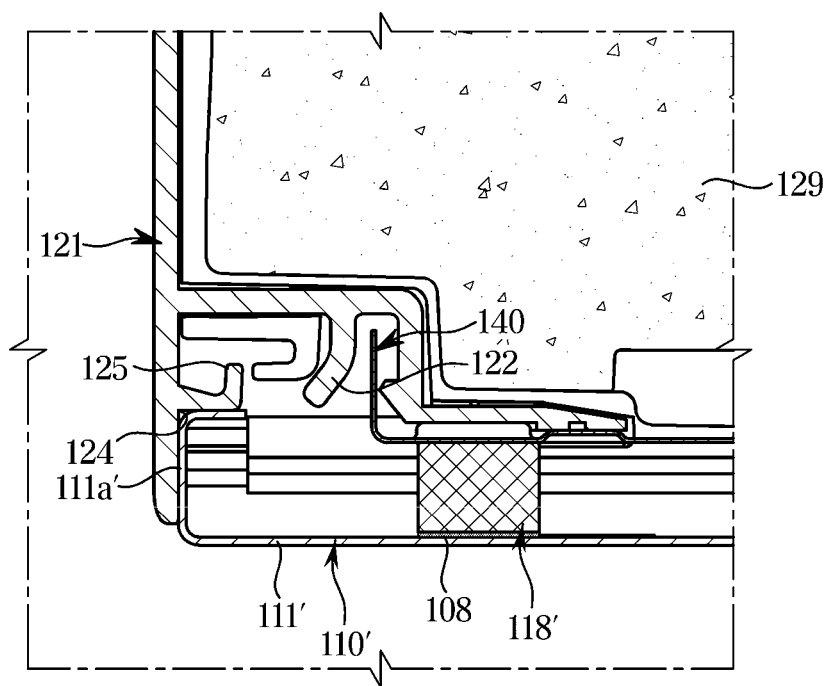
FIG. 17 is a cross-sectional view illustrating a state in which a side trim illustrated in FIG. 14 is coupled to the door body.

FIG. 14 illustrates an exploded perspective view of a door panel according to another embodiment of the disclosure. FIG. 15 is a cross-sectional view illustrating a state in which a lower trim illustrated in FIG. 14 is coupled to a door body. FIG. 16 is a cross-sectional view illustrating a state in which an upper trim illustrated in FIG. 14 is coupled to the door body. FIG. 17 is a cross-sectional view illustrating a state in which a side trim illustrated in FIG. 14 is coupled to the door body.

A door panel 110' according to another embodiment of the disclosure will be described with reference to FIGS. 14 to 17. The same numbers will be assigned to the same components as those of the above-described embodiment, and detailed descriptions thereof may be omitted.

Referring to FIG. 14, the door panel 110' according to another embodiment of the disclosure may include a panel body 111', the buffer member 115, the fixing trims 116 and 117, and a fixing trim 118'. The panel body 111' and the side trim 118' of the door panel 110' according to another embodiment of the disclosure are different from those of the door panel 110 illustrated in FIG. 3, and the other components of the door panels 110' may be the same as those of the door panel 110.

Unlike the panel body 111 including the glass illustrated in FIGS. 8 to 10, when the panel body 111' of the door panel 110' according to another embodiment of the disclosure is formed of a relatively thin iron plate, an end of the panel body 111' may not be easily finished so as not to be sharpen like the finishing of the end of the panel body 111 illustrated in FIGS. 8 to 10.

Referring to FIGS. 14 to 17, in this case, the end of the panel body 111' may be bent toward a direction of being coupled to the door body 120. The end portion of the bent panel body 111' may be referred to as a panel bent portion 111a'.

Specifically, referring to FIG. 15, the panel bent portion 111a' of a lower end of the panel body 111' may be bent to be positioned below the lower trim 116. The panel bent portion 111a' of the lower end of the panel body 111' may be positioned between the lower trim 116 and a front end portion of the lower cap body 137.

Referring to FIG. 16, the panel bent portion 111a' of an upper end of the panel body 111' may be bent to be positioned above the upper trim 117. The panel bent portion 111a' of the upper end of the panel body 111' may be positioned between the upper trim 117 and a front end portion of the upper cap body 131.

Referring to FIG. 17, the panel bent portions 111a' of the left and right sides of the panel body 111' may be positioned in chassis accommodating portions 124 of the chassis 121 and 126. The chassis 121 and 126 may include the chassis accommodating portion 124 formed to accommodate the panel bent portion 111a' of the panel body 111'. The panel bent portion 111a' may be supported by the chassis accommodating portion 124 when the door panel 110' is coupled to the door body 120.

The chassis 121 and 126 may include the chassis accommodating portion 124 even when the door panel 110 illustrated in FIG. 10 is mounted. That is, the chassis 121 and 126 including the chassis accommodating portion 124 may be compatible with various types of the door panels 110 and 110'.

Referring to FIGS. 14 and 17, the side trim 118' may be disposed at ends of the left and right sides of the panel body 111'. The side trim 118' may be fixed to the panel body 111' through the adhesive 108. The adhesive 108 may be provided as double-sided tape. The side trim 118' may allow the ends of the left and right sides of the door panel 110' to be securely fixed to the door body 120 when the door panel 110' is coupled to the door body 120.

The side trim 118' may include a magnetic body. The side trim 118' may be provided to generate an attractive force between the cover 140 and the side trim 118' when the door panel 110' is coupled to the door body 120. The cover 140 may include steel. As the side trim 118' comes into contact with and is fixed to the cover 140 by the attractive force between the side trim 118' and the cover 140, the opposite side ends of the door panel 110' may be in close contact with and stably fixed to the door body 120.

The side trim 118' may extend in a vertical direction along edges of the left and right sides of the panel body 111'. The side trim 118' may be disposed to be spaced apart from the panel bent portion 111a' of the panel body 111'.

Figure 18:
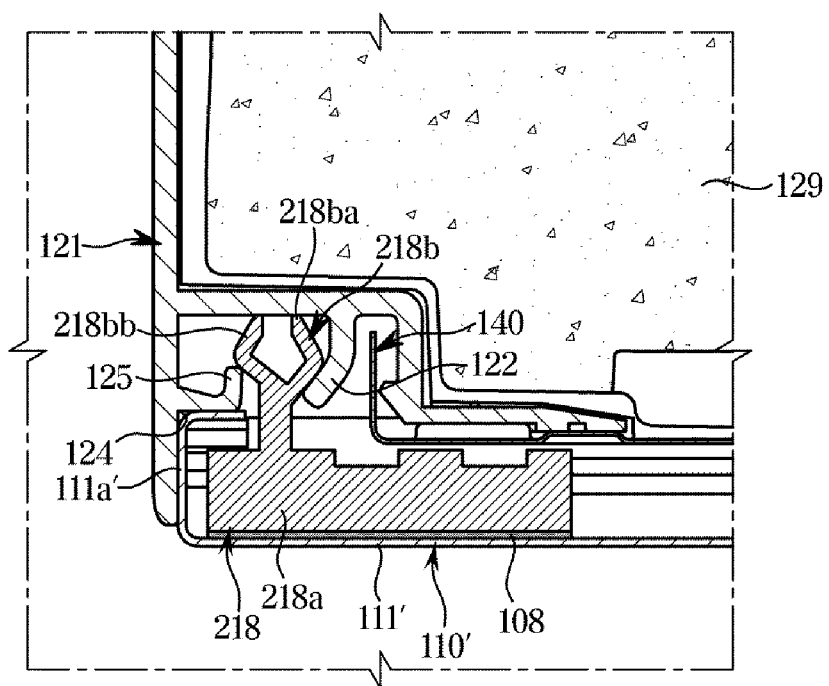
FIG. 18 is a cross-sectional view illustrating a state in which a side trim according to another embodiment of the disclosure is coupled to the door body.

FIG. 18 is a cross-sectional view illustrating a state in which a side trim according to another embodiment of the disclosure is coupled to the door body.

A side trim 218 according to another embodiment of the disclosure will be described with reference to FIG. 18. The same numbers will be assigned to the same components as those of the above-described embodiment, and detailed descriptions thereof may be omitted.

Referring to FIG. 18, the side trim 218 according to another embodiment of the disclosure may include a side trim body 218a and a side trim protrusion 218b. The side trim 218 may include acrylonitrile-butadiene-styrene resin (ABS resin).

The side trim body 218a may extend in a substantially vertical direction to be fixed to a left end and right end of the panel body 111', respectively. The side trim body 218a may have a substantially rectangular plate shape. The side trim body 218a may be fixed to the panel body 111' through the adhesive 108.

The side trim protrusion 218b may protrude rearward from the side trim body 218a. The side trim protrusions 218b may be coupled to the chassis 121 and 126, respectively. The side trim protrusion 218b may include a first locking portion 218ba and a second locking portion 218bb.

The first locking portion 218ba may be coupled to the chassis fixing portion 122. The second locking portion 218bb may be coupled to a chassis locking portion 125. The side trim protrusion 218b may have a shape of extending rearward from the side trim body 218a and then being branched into the first locking portion 218ba and the second locking portion 218bb. The first locking portion 218ba and the second locking portion 218bb may be branched in opposite directions.

The first locking portion 218ba and the second locking portion 218bb may include a material having a predetermined elasticity so that the first and second locking portions 218ba and 218bb may be restored after being deformed by being pressed by the chassis fixing portion 122 and the chassis locking portion 125 when coupled to the chassis fixing portion 122 and the chassis locking portion 125. The first locking portion 218ba and the second locking portion 218bb may be provided such that an elastic force is generated in a direction of coming into contact with the chassis fixing portion 122 and the chassis locking portion 125, respectively, when the side trim 118 is coupled to the door body 120. The first locking portion 218*ba* may have a shape in which at least a portion thereof is bent toward the chassis fixing portion 122. The second locking portion 218*bb* may have a shape in which at least a portion thereof is bent toward the chassis locking portion 125.

Figure 19:
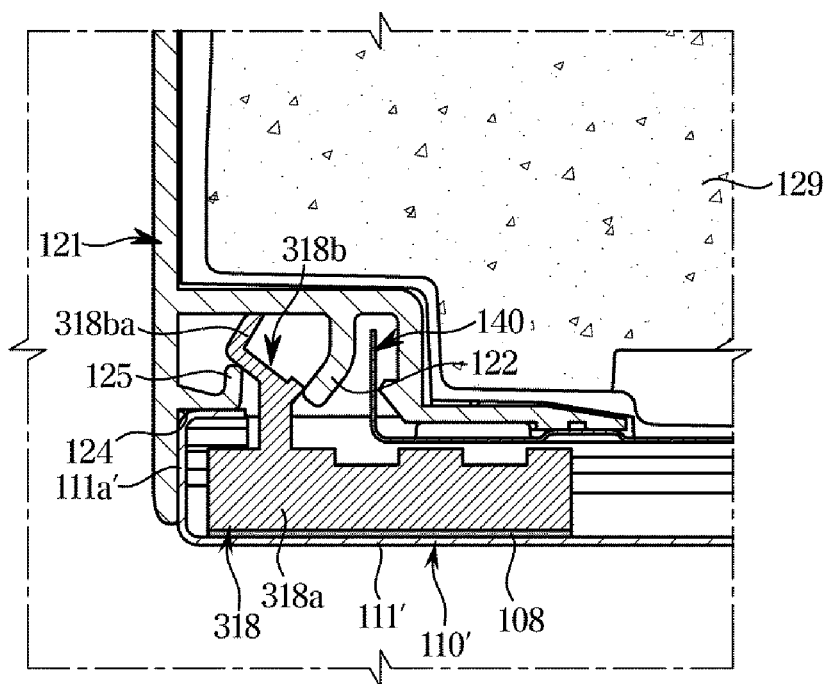
FIG. 19 is a cross-sectional view illustrating a state in which a side trim according to another embodiment of the disclosure is coupled to the door body.

FIG. 19 is a cross-sectional view illustrating a state in which a side trim according to another embodiment of the disclosure is coupled to the door body.

A side trim 318 according to another embodiment of the disclosure will be described with reference to FIG. 19. The same numbers will be assigned to the same components as those of the above-described embodiment, and detailed descriptions thereof may be omitted.

Referring to FIG. 19, the side trim 318 according to another embodiment of the disclosure may include a side trim body 318*a* and a side trim protrusion 318*b*. The configuration of the side trim body 318*a* is the same as that of the side trim body 218*a* illustrated in FIG. 18.

The side trim protrusion 318*b* may protrude rearward from the side trim body 318*a*. The side trim protrusions 318*b* may be coupled to the chassis 121 and 126. The side trim protrusion 318*b* may include a locking portion 318*ba*. The configuration of the locking portion 318*ba* may be substantially the same as that of the second locking portion 218*bb* illustrated in FIG. 18. That is, the side trim protrusion 318*b* illustrated in FIG. 19 may be configured such that the first locking portion 218*ba* is not provided compared to the side trim protrusion 218*b* illustrated in FIG. 18.

Figure 20:
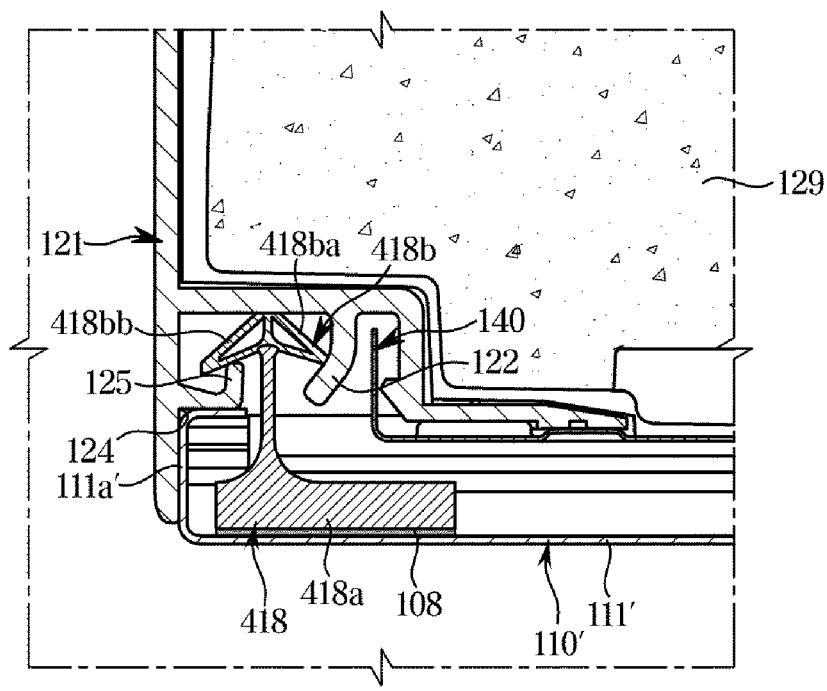
FIG. 20 is a cross-sectional view illustrating a state in which a side trim according to another embodiment of the disclosure is coupled to the door body.

FIG. 20 is a cross-sectional view illustrating a state in which a side trim according to another embodiment of the disclosure is coupled to the door body.

A side trim 418 according to another embodiment of the disclosure will be described with reference to FIG. 20. The same numbers will be assigned to the same components as those of the above-described embodiment, and detailed descriptions thereof may be omitted.

Referring to FIG. 20, the side trim 418 according to another embodiment of the disclosure may include a side trim body 418*a* and a side trim protrusion 418*b*.

The side trim body 418*a* may extend in a substantially vertical direction to be fixed to the left end and right end of the panel body 111', respectively. The side trim body 418*a* may have a substantially rectangular plate shape. The side trim body 418*a* may be fixed to the panel body 111' through the adhesive 108.

The side trim protrusion 418*b* may protrude rearward from the side trim body 418*a*. The side trim protrusions 418*b* may be coupled to the chassis 121 and 126, respectively. The side trim protrusion 418*b* may include a first locking portion 418*ba* and a second locking portion 418*bb*.

The first locking portion 418*ba* may be coupled to the chassis fixing portion 122. The second locking portion 418*bb* may be coupled to the chassis locking portion 125. The first locking portion 418*ba* and the second locking portion 418*bb* may be provided to face in opposite directions.

The side trim protrusion 418*b* may include a material that is more flexible than the side trim body 418*a*. Specifically, the side trim protrusion 418*b* may include a material having a predetermined elasticity so that the side trim protrusion 418*b* may be restored after being deformed by being pressed by the chassis fixing portion 122 and the chassis locking portion 125 when coupled to the chassis fixing portion 122 and the chassis locking portion 125. The side trim body 418*a* may include hard polyvinyl chloride (PVC), and the side trim protrusion 418*b* may include soft polyvinyl chloride (PVC).

The first locking portion 418*ba* may be provided to be supported by the chassis fixing portion 122 when the side trim 418 is coupled to the door body 120. The second locking portion 418*bb* may be provided to be supported by the chassis locking portion 125 when the side trim 418 is coupled to the door body 120. That is, the side trim protrusions 418*b* may be formed to be unfolded after being constricted in a process of being coupled to the chassis 121 and 126. When the side trim protrusions 418*b* are coupled to the chassis 121 and 126, the first locking portion 418*ba* and the second locking portion 418*bb* may be unfolded to be supported by the chassis fixing portion 122 and the chassis locking portion 125, respectively.

Figure 21:
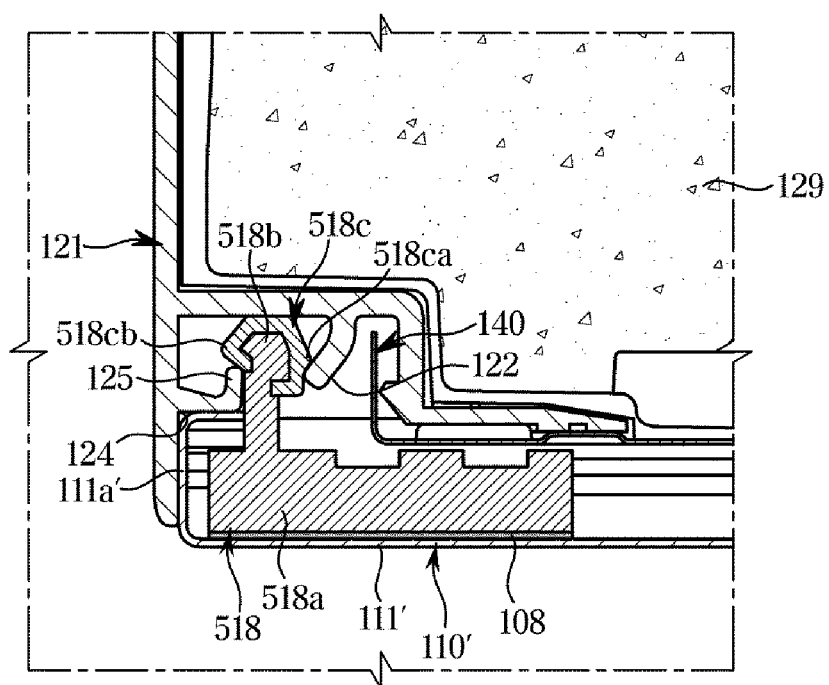
FIG. 21 is a cross-sectional view illustrating a state in which a side trim according to another embodiment of the disclosure is coupled to the door body.

FIG. 21 is a cross-sectional view illustrating a state in which a side trim according to another embodiment of the disclosure is coupled to the door body.

A side trim 518 according to another embodiment of the disclosure will be described with reference to FIG. 21. The same numbers will be assigned to the same components as those of the above-described embodiment, and detailed descriptions thereof may be omitted.

Referring to FIG. 21, the side trim 519 according to another embodiment of the disclosure may include a side trim body 518*a*, a side trim protrusion 518*b*, and a side trim cover 518*c*.

The side trim body 518*a* may extend in a substantially vertical direction to be fixed to the left end and right end of the panel body 111', respectively. The side trim body 518*a* may have a substantially rectangular plate shape. The side trim body 518*a* may be fixed to the panel body 111' through the adhesive 108.

The side trim protrusion 518*b* may protrude rearward from the side trim body 518*a*. The side trim cover 518*c* may be provided at an outer side of the side trim protrusion 518*b*.

The side trim cover 518*c* may be coupled to the side trim protrusion 518*b* to cover a circumference of the side trim protrusion 518*b*. The side trim cover 518*c* may include a material that is more flexible than the side trim protrusion 518*b*. Specifically, the side trim cover 518*c* may include a material having a predetermined elasticity so that the side trim cover 518*c* may be restored after being deformed by being pressed by the chassis fixing portion 122 and the chassis locking portion 125 when coupled to the chassis fixing portion 122 and the chassis locking portion 125. The side trim cover 518*c* may include a first locking portion 518*ca* provided to be locked to the chassis fixing portion 122, and a second locking portion 518*cb* provided to be locked to the chassis locking portion 125. The side trim body 518*a* and the side trim protrusion 518*b* may include acrylonitrile-butadiene-styrene resin (ABS resin), and the side trim cover 518*c* may include rubber.

The side trim cover 518*c* may be supported by the chassis fixing portion 122 and the chassis locking portion 125 by being deformed to be contracted during passing between the chassis fixing portion 122 and the chassis locking portion 125 and then restored to be unfold after passing. The chassis fixing portion 122 may support the first locking portion 518*ca*, and the chassis locking portion 125 may support the second locking portion 518*cb*.

Figure 22:
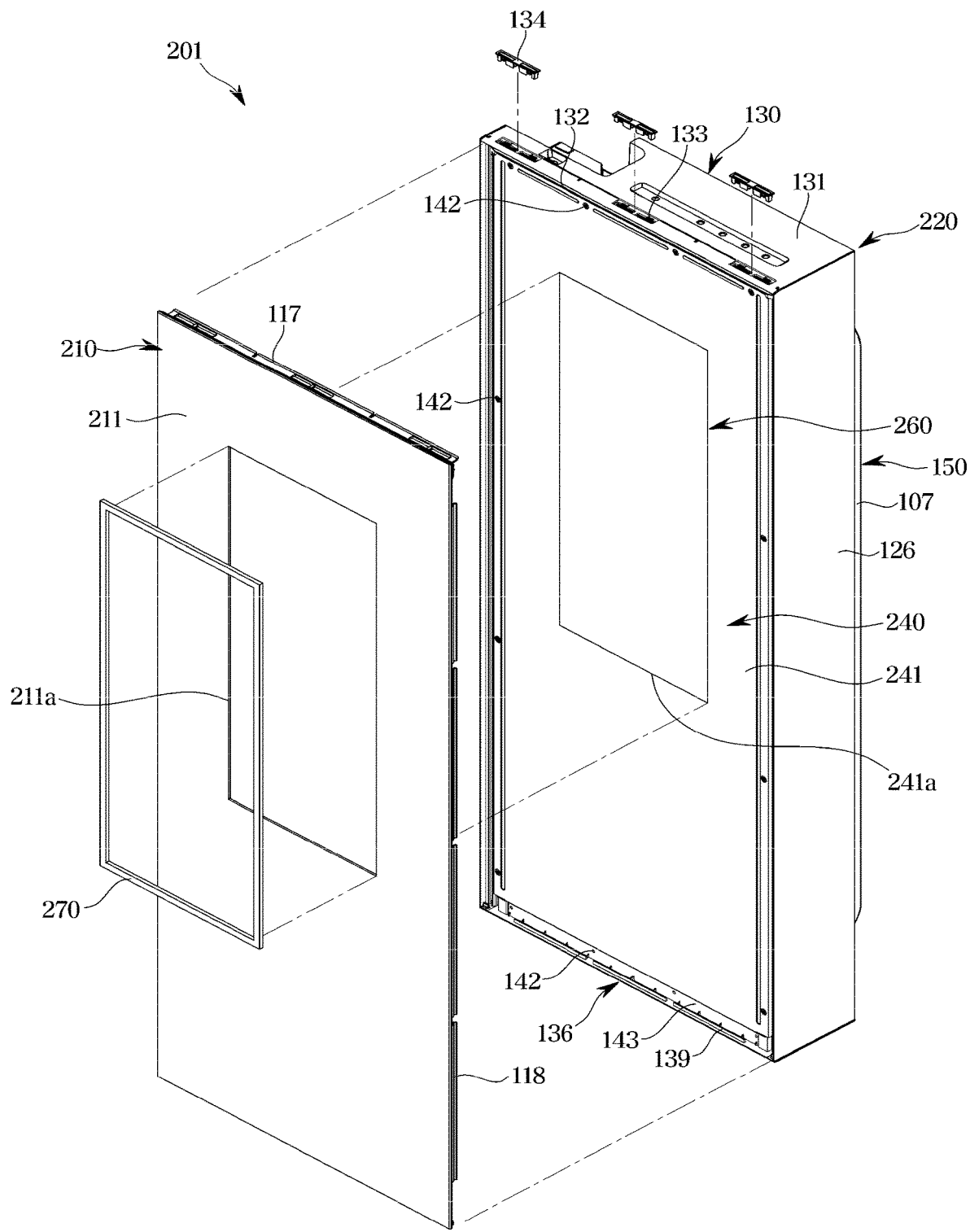
FIG. 22 illustrates an exploded perspective view of a first door according to another embodiment of the disclosure.

FIG. 22 illustrates an exploded perspective view of a first door according to another embodiment of the disclosure.

A first door 201 according to another embodiment of the disclosure will be described with reference to FIG. 22. The same numbers will be assigned to the same components as those of the above-described embodiment, and detailed descriptions thereof may be omitted.

Referring to FIG. 22, the first door 201 according to another embodiment of the disclosure may include a door panel 210, a door body 220, and a door display 260. One of the structures provided in the embodiments illustrated in FIGS. 3, 14, and 18 to 21 may be applied to a structure in which the door panel 210 is coupled to the door body 220.

The door display 260 may be mounted on the door body 220. A display opening 241a for exposing the door display 260 to the outside may be formed on a cover body 241 of a cover 240.

A panel opening 211a for exposing the door display 260 to the outside may be formed on the door panel 210. The panel opening 211a may be formed slightly larger than a size of the door display 260.

A display bezel 270 may be mounted on an edge of the panel opening 211a formed on a panel body 211 of the door panel 210. The display bezel 270 may cover a gap formed between the panel opening 211a and the door display 260. Specifically, when the panel opening 211a is formed on the panel body 211 of the door panel 210, smooth finishing of the edge of the panel opening 211a may not be easy. As such, when the edge of the panel opening 211a is not smoothly finished, the edge of the panel opening 211a may be smoothly finished by mounting the display bezel 270 on the panel opening 211a.

Figure 23:
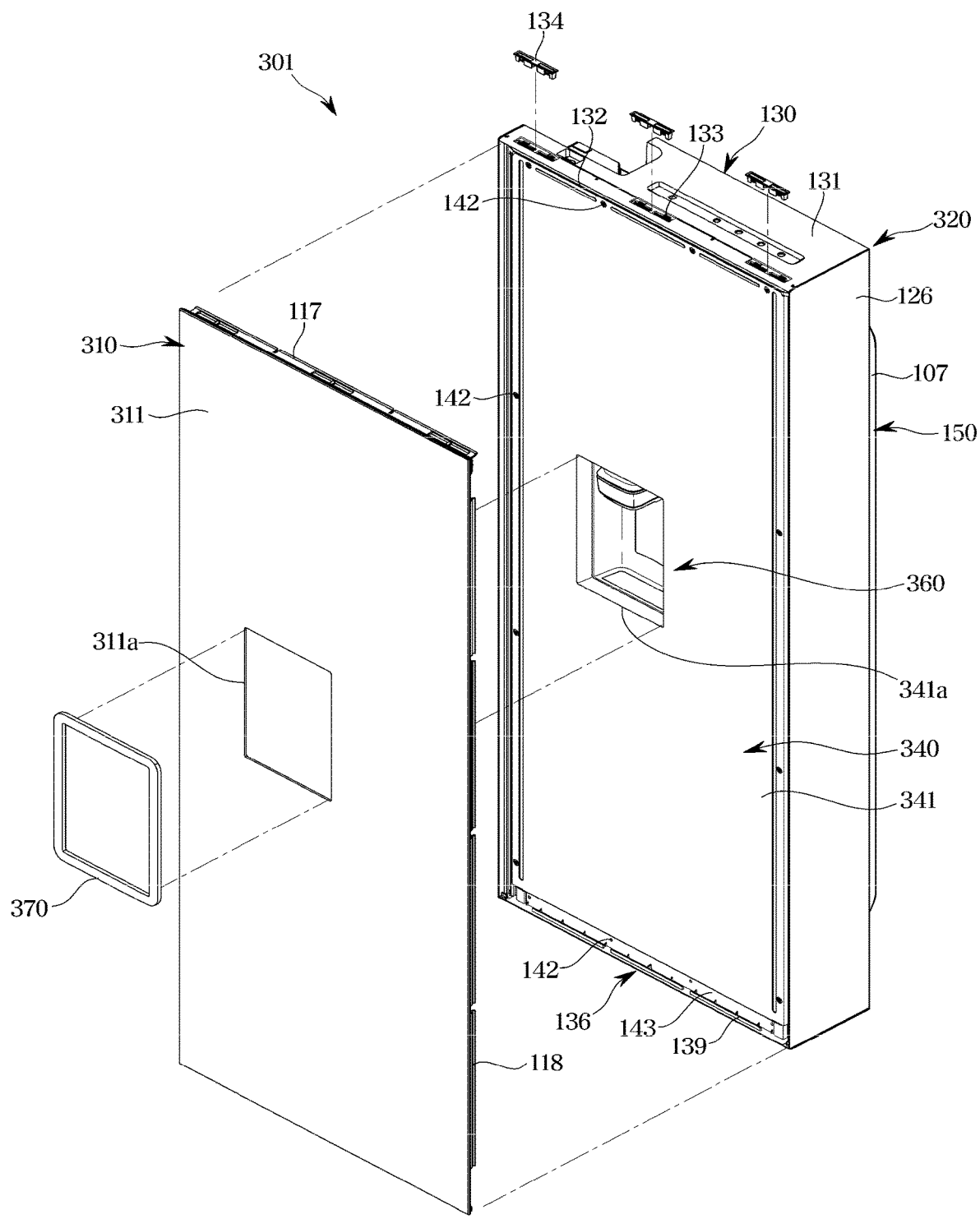
FIG. 23 illustrates an exploded perspective view of a first door according to another embodiment of the disclosure.

FIG. 23 illustrates an exploded perspective view of a first door according to another embodiment of the disclosure.

A first door 301 according to another embodiment of the disclosure will be described with reference to FIG. 23. The same numbers will be assigned to the same components as those of the above-described embodiment, and detailed descriptions thereof may be omitted.

Referring to FIG. 23, the first door 301 according to another embodiment of the disclosure may include a door panel 310, a door body 320, and a dispenser 360. One of the structures provided in the embodiments illustrated in FIGS. 3, 14, and 18 to 21 may be applied to a structure in which the door panel 310 is coupled to the door body 320.

The dispenser 360 may be mounted on the door body 320. A dispenser opening 341a for exposing the dispenser 360 to the outside may be formed on a cover body 341 of a cover 340.

A panel opening 311a for exposing the dispenser 360 to the outside may be formed on the door panel 310. The panel opening 311a may be formed slightly larger than a size of the dispenser 360.

A dispenser bezel 370 may be mounted on an edge of the panel opening 311a formed on a panel body 311 of the door panel 310. The dispenser bezel 370 may cover a gap formed between the panel opening 311a and the dispenser 360. Specifically, when the panel opening 311a is formed on the panel body 311 of the door panel 310, smooth finishing of the edge of the panel opening 311a may not be easy. As such, when the edge of the panel opening 311a is not smoothly finished, the edge of the panel opening 311a may be smoothly finished by mounting the dispenser bezel 370 on the panel opening 311a.

Figure 24:
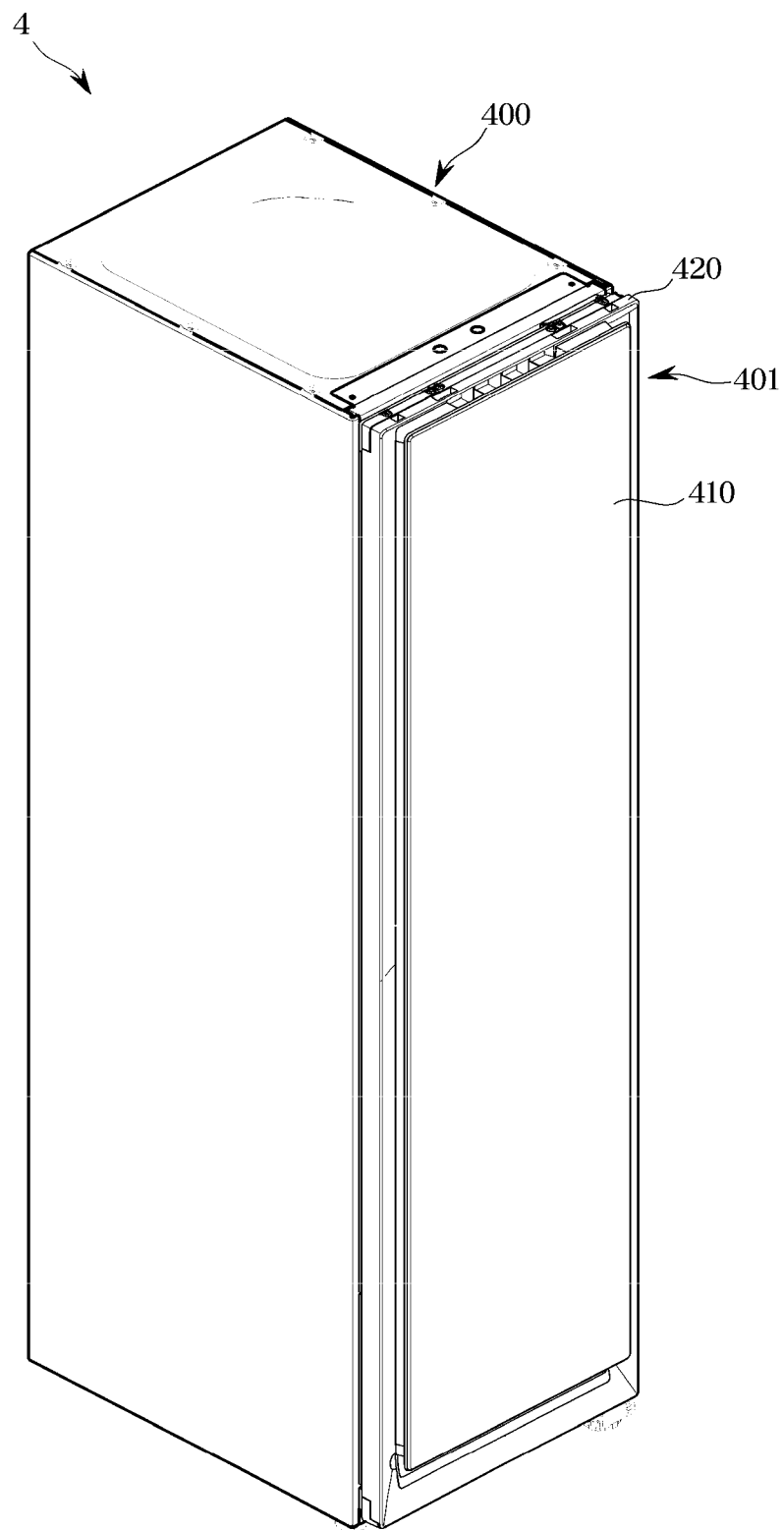
FIG. 24 illustrates a clothes manager to which a door panel and a door body according to another embodiment of the disclosure are applied.
Figure 25:
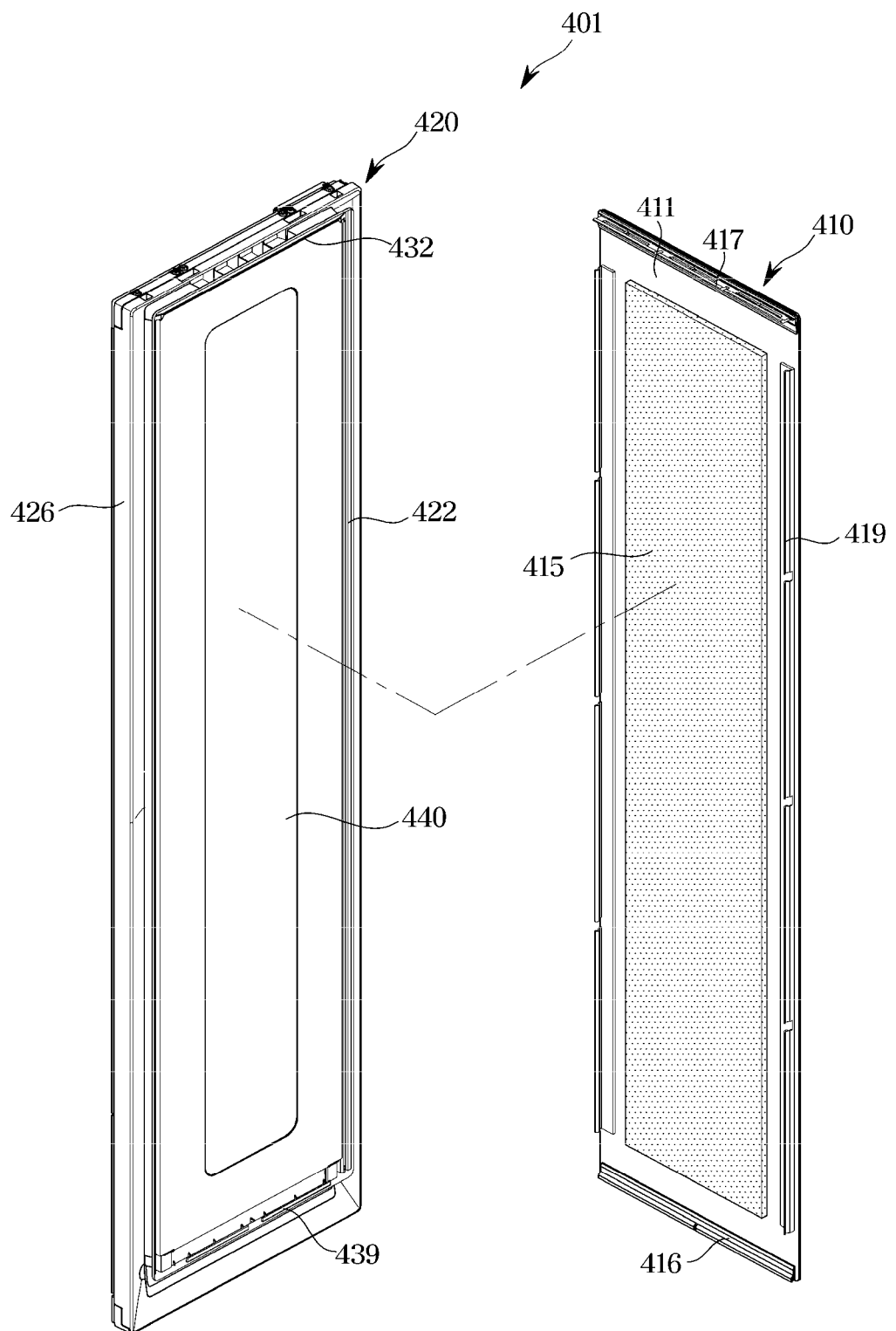
FIG. 25 illustrates a state in which the door panel illustrated in FIG. 24 is separated from the door body.

FIG. 24 illustrates a clothes manager to which a door panel and a door body according to another embodiment of the disclosure are applied. FIG. 25 illustrates a state in which the door panel illustrated in FIG. 24 is separated from the door body.

A clothes manager 4 to which a door panel 410 and a door body 420 are applied according to another embodiment of the disclosure will be described with reference to FIGS. 24 and 25. Detailed descriptions of the same configurations as those of the door panel 110 and the door body 120 illustrated in FIG. 3 may be omitted.

Referring to FIGS. 24 and 25, the clothes manager 4 may include a main body 400 forming an appearance and a door 401 rotatably coupled to the main body 400. The clothes manager 4 may include a clothes management compartment provided inside the main body 400 to accommodate and manage clothes, a clothes support member provided inside the clothes management compartment to hang clothes, and a machine compartment in which a heat exchange device for dehumidifying or heating air inside the clothes management compartment is accommodated.

The door 401 may include a door panel 410 and a door body 420. The door panel 410 may be detachably coupled to the door body 420.

Referring to FIG. 25, the door panel 410 may include a panel body 411, a buffer member 415, and fixing trims 416, 417, and 419.

Various designs may be provided on a front surface of the panel body 411 to meet the needs of users. The fixing trims 416, 417, and 419 for coupling with the door body 420 may be disposed on a rear surface of the panel body 411. The buffer member 415 may be disposed in a space formed between the door panel 410 and the door body 420.

The fixing trims 416, 417, and 419 may include the lower trim 416, the upper trim 417, and the side trim 419. By the fixing trims 416, 417 and 419, the door panel 410 may be securely coupled to the door body 420 and may be easily detached from the door body 420.

Specifically, the lower trim 416 may be coupled to a lower cap protrusion 439 provided on the door body 420, the upper trim 417 may be coupled to an upper coupling groove 432 provided on the door body 420, and the side trim 419 may be coupled to a chassis fixing portion 422 provided on the door body 420.

The door body 420 may include a door frame 426. The door frame 426 may include the chassis fixing portion 422 formed on the left and right side portions thereof. The chassis fixing portion 422 may be coupled to the side trim 419. The door frame 426 may include the upper coupling groove 432 formed at an upper end thereof. The upper coupling groove 432 may be formed to accommodate a portion of the upper trim 417. The door frame 426 may include the lower cap protrusion 439 formed at a lower end thereof. The lower cap protrusion 439 may be inserted into the lower trim 416.

The cover 440 may be mounted to the door frame 426 to cover an open front of the door frame 426.

A process of mounting the door panel 410 on the door body 420 or separating the door panel 410 from the door body 420 is the same as that of mounting the door panel 110 on the door body 120 or separating the door panel 110 from the door body 120 which is illustrated in FIGS. 11 to 13. That is, the lower trim 416, the upper trim 417, the side trim 419, the chassis fixing portion 422, the upper coupling groove 432, and the lower cap protrusion 439, which are illustrated in FIG. 25, may be configured to be the same as the lower trim 116, the upper trim 117, the side trim 118, the chassis fixing portion 122, the upper coupling groove 132, and the lower cap protrusion 139, which are illustrated in FIG. 3, respectively.

In the clothes manager 4 including the door panel 410 and the door body 420 according to another embodiment of the disclosure, the door panel 410 may be easily coupled to the door body 420 or may be easily separated from the door body 420. Accordingly, the design and/or material of the door 401 of the clothes manager 4 may be easily changed according to the needs of users.

Figure 26:
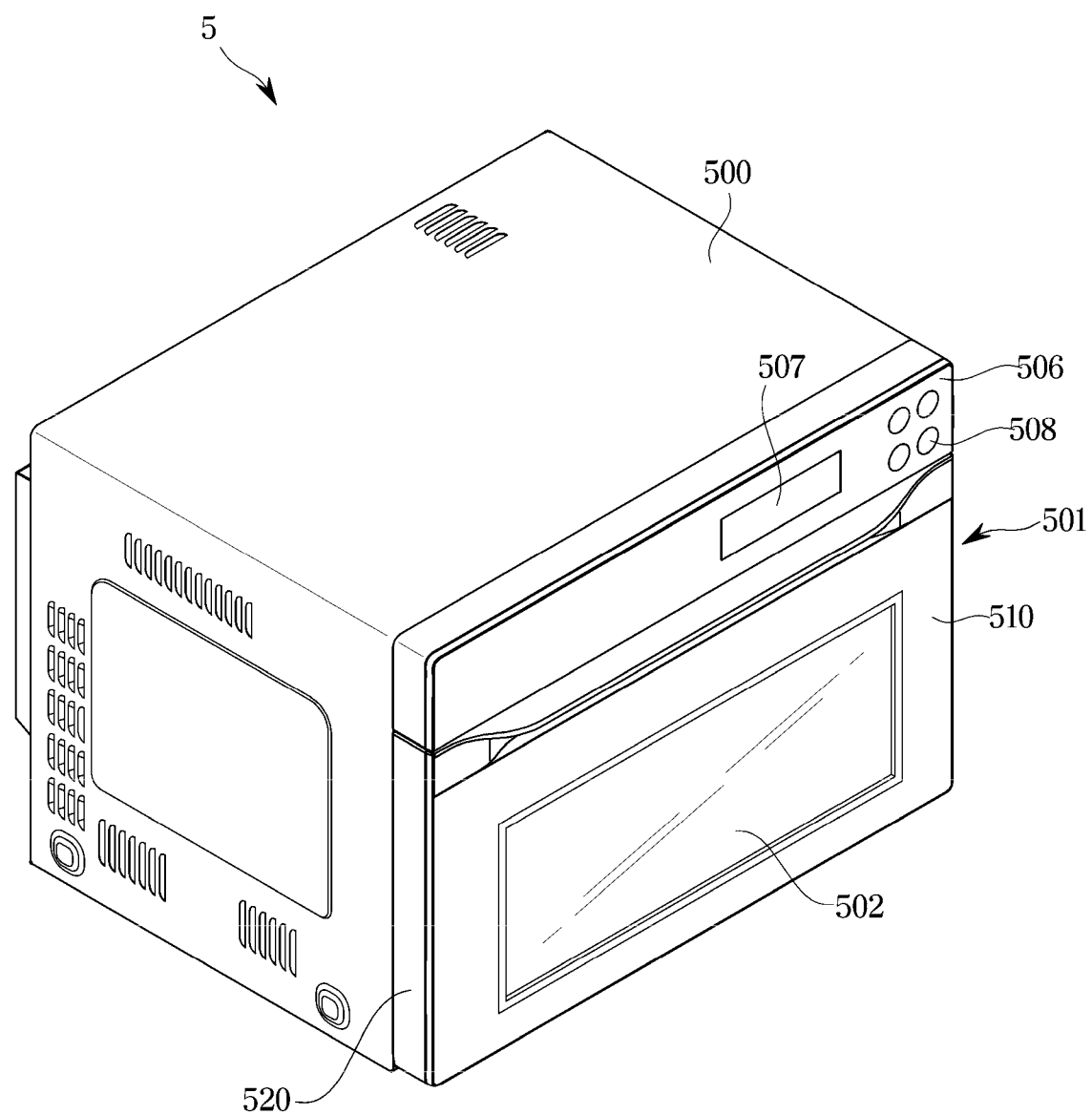
FIG. 26 illustrates a cooking appliance to which a door panel and a door body according to another embodiment of the disclosure are applied.
Figure 27:
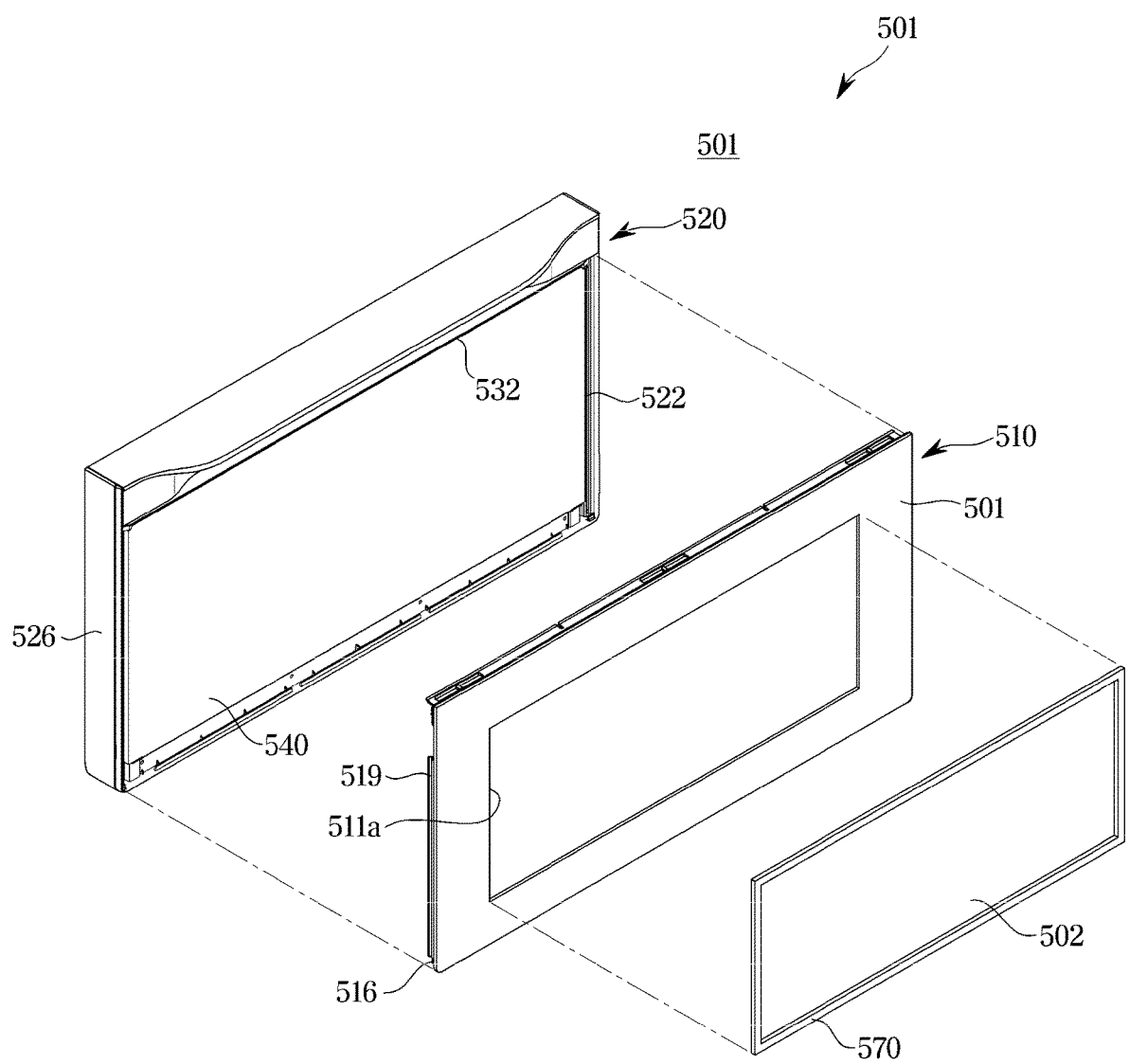
FIG. 27 illustrates a state in which the door panel illustrated in FIG. 26 is separated from the door body.

FIG. 26 illustrates a cooking appliance to which a door panel and a door body according to another embodiment of the disclosure are applied. FIG. 27 illustrates a state in which the door panel illustrated in FIG. 26 is separated from the door body.

A cooking appliance 5 to which a door panel 510 and a door body 520 are applied according to another embodiment of the disclosure will be described with reference to FIGS. 26 and 27. Detailed descriptions of the same configurations as those of the door panel 110 and the door body 120 illustrated in FIG. 3 may be omitted.

Referring to FIGS. 26 and 27, the cooking appliance 5 may include a main body 500 forming an appearance and a door 501 provided to open and close an open front of the main body 500. The cooking appliance 5 may include a cooking chamber formed inside the main body 500 to cook food.

A control panel 506 may be installed at an upper front of the cooking appliance 5. The control panel 506 may include an input 508 and a display 507. The input 508 may be provided to allow a user to input a command for an operation such as a cooking function, a cooking mode, and a cooking time of the cooking appliance 5. As an example, the input 508 may be provided with a plurality of switches through which the user may select a cooking mode. The plurality of switches of the input 508 may be provided in a touch sensing method. The display 507 may be configured to display conditions set by the user and operation states according to the conditions, using letters, numbers, and symbols.

The door 501 may include a door panel 510 and a door body 520. The door panel 510 may be detachably coupled to the door body 520.

Referring to FIG. 27, the door panel 510 may include a panel body 511, a buffer member, and fixing trims 516, 517, and 519.

Various designs may be provided on a front surface of the panel body 511 to meet the needs of users. The fixing trims 516, 517, and 519 for coupling with the door body 520 may be disposed on a rear surface of the panel body 511. The buffer member may be disposed in a space formed between the door panel 510 and the door body 520.

The fixing trims 516, 517, and 519 may include the lower trim 516, the upper trim 517, and the side trim 519. By the fixing trims 516, 517 and 519, the door panel 510 may be securely coupled to the door body 520 and may be easily detached from the door body 520.

Specifically, the lower trim 516 may be coupled to a lower cap protrusion 539 provided on the door body 520, the upper trim 517 may be coupled to an upper coupling groove 532 provided on the door body 520, and the side trim 519 may be coupled to a chassis fixing portion 522 provided on the door body 520.

The door body 520 may include a door frame 526. The door frame 526 may include the chassis fixing portion 522 formed on the left and right side portions thereof. The chassis fixing portion 522 may be coupled to the side trim 519. The door frame 526 may include the upper coupling groove 532 formed at an upper end thereof. The upper coupling groove 532 may be formed to accommodate a portion of the upper trim 517. The door frame 526 may include the lower cap protrusion 539 formed at a lower end thereof. The lower cap protrusion 539 may be inserted into the lower trim 516.

The cover 540 may be mounted to the door frame 526 to cover an open front of the door frame 526.

The door 501 may be provided with a see-through window 502 on a front side so that the inside of the cooking chamber may be seen in a state in which the cooking chamber is closed. The user may check the cooking process through the see-through window 502 provided on the door 501 during cooking food.

A panel opening 511a in which the see-through window 502 is mounted may be formed in the door panel 510. The panel opening 511a may be formed slightly larger than a size of the see-through window 502.

A see-through window bezel 570 may be mounted on an edge of the panel opening 511a formed on the panel body 511 of the door panel 510. The see-through window bezel 570 may cover a gap formed between the panel opening 511a and the see-through window 502.

A process of mounting the door panel 510 on the door body 520 or separating the door panel 510 from the door body 520 is the same as that of mounting the door panel 110 on the door body 120 or separating the door panel 110 from the door body 120 which is illustrated in FIGS. 11 to 13. That is, the lower trim 516, the upper trim 517, the side trim 519, the chassis fixing portion 522, the upper coupling groove 532, and the lower cap protrusion 539, which are illustrated in FIG. 27, may be configured to be the same as the lower trim 116, the upper trim 117, the side trim 118, the chassis fixing portion 122, the upper coupling groove 132, and the lower cap protrusion 139, which are illustrated in FIG. 3, respectively.

In the cooking appliance 5 including the door panel 510 and the door body 520 according to another embodiment of the disclosure, the door panel 510 may be easily coupled to the door body 520 or may be easily separated from the door body 520. Accordingly, the design and/or material of the door 501 of the cooking appliance 5 may be easily changed according to the needs of users.

Figure 28:
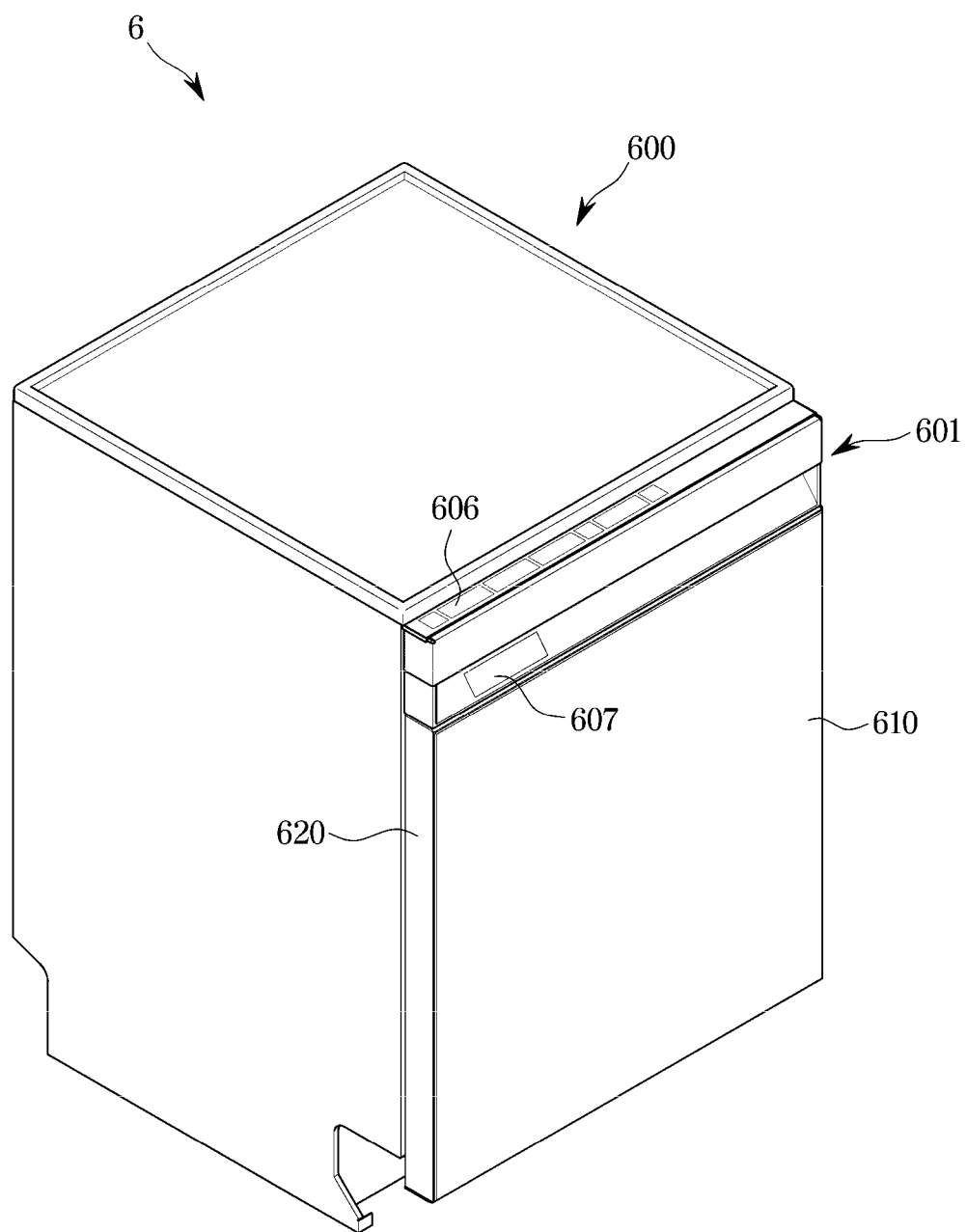
FIG. 28 illustrates a dishwasher to which a door panel and a door body according to another embodiment of the disclosure are applied.
Figure 29:
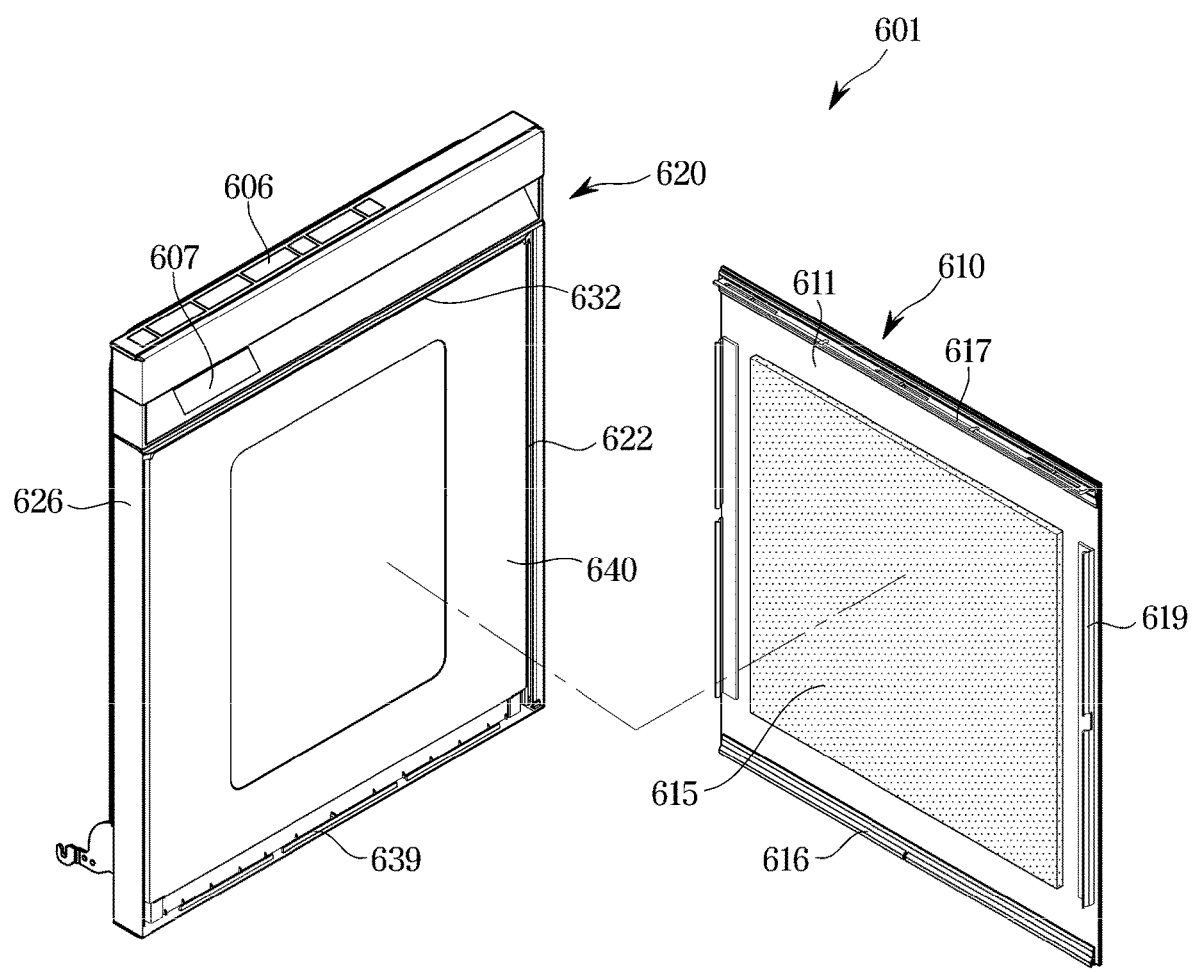
FIG. 29 illustrates a state in which the door panel illustrated in FIG. 28 is separated from the door body.

FIG. 28 illustrates a dishwasher to which a door panel and a door body according to another embodiment of the disclosure are applied. FIG. 29 illustrates a state in which the door panel illustrated in FIG. 28 is separated from the door body.

A dishwasher 6 to which a door panel 610 and a door body 620 are applied according to another embodiment of the disclosure will be described with reference to FIGS. 28 and 29. Detailed descriptions of the same configurations as those of the door panel 110 and the door body 120 illustrated in FIG. 3 may be omitted.

Referring to FIGS. 28 and 29, the dishwasher 6 may include a main body 600 forming an appearance and a door 601 provided to open and close an open front of the main body 600. The dishwasher 6 may include a washing chamber formed inside the main body 600.

The door 601 may be provided with a controller 606 configured to control the dishwasher 6. The controller 606 may be positioned at an upper end of the door 601. A PCB may be installed in the control 606.

A display 607 may be disposed on the door 601. The display 607 may be configured to visually display an operating state of the dishwasher 6. The display 607 is provided to display various information such as an operating state and an operating time of the dishwasher 6.

The door 601 may include a door panel 610 and a door body 620. The door panel 610 may be detachably coupled to the door body 620.

Referring to FIG. 29, the door panel 610 may include a panel body 611, a buffer member 615, and fixing trims 616, 617, and 619.

Various designs may be provided on a front surface of the panel body 611 to meet the needs of users. The fixing trims 616, 617, and 619 for coupling with the door body 620 may be disposed on a rear surface of the panel body 611. The buffer member 615 may be disposed in a space formed between the door panel 610 and the door body 620.

The fixing trims 616, 617, and 619 may include the lower trim 616, the upper trim 617, and the side trim 619. By the fixing trims 616, 617 and 619, the door panel 610 may be securely coupled to the door body 620 and may be easily detached from the door body 620.

Specifically, the lower trim 616 may be coupled to a lower cap protrusion 639 provided on the door body 620, the upper trim 617 may be coupled to an upper coupling groove 632 provided on the door body 620, and the side trim 619 may be coupled to a chassis fixing portion 622 provided on the door body 620.

The door body 620 may include a door frame 626. The door frame 626 may include the chassis fixing portion 622 formed on the left and right side portions thereof. The chassis fixing portion 622 may be coupled to the side trim 619. The door frame 626 may include the upper coupling groove 632 formed at an upper end thereof. The upper coupling groove 632 may be formed to accommodate a portion of the upper trim 617. The door frame 626 may include the lower cap protrusion 639 formed at a lower end thereof. The lower cap protrusion 639 may be inserted into the lower trim 616.

The cover 640 may be mounted to the door frame 626 to cover an open front of the door frame 626.

A process of mounting the door panel 610 on the door body 620 or separating the door panel 610 from the door body 620 is the same as that of mounting the door panel 110 on the door body 120 or separating the door panel 110 from the door body 120 which is illustrated in FIGS. 11 to 13. That is, the lower trim 616, the upper trim 617, the side trim 619, the chassis fixing portion 622, the upper coupling groove 632, and the lower cap protrusion 639, which are illustrated in FIG. 29, may be configured to be the same as the lower trim 116, the upper trim 117, the side trim 118, the chassis fixing portion 122, the upper coupling groove 132, and the lower cap protrusion 139, which are illustrated in FIG. 3, respectively.

In the dishwasher 6 including the door panel 610 and the door body 620 according to another embodiment of the disclosure, the door panel 610 may be easily coupled to the door body 620 or may be easily separated from the door body 620. Accordingly, the design and/or material of the door 601 of the dishwasher 6 may be easily changed according to the needs of users.

In the above, only the embodiments in which the door panel detachable from the door body according to the embodiments of the disclosure are applied to the refrigerator, clothes manager, cooking appliance, and dishwasher have been described, but the door panel detachable from the door body according to the embodiments of the disclosure may be applied to any home appliance in the case of the home appliance including a door.

As is apparent from the above, according to the disclosure, because a refrigerator and a home appliance include a door panel detachably mounted on a door body, the design of the door can be easily changed.

According to the disclosure, because an edge of the door panel of the refrigerator and the home appliance is fixed to the door body, the edge of the door panel can be prevented from being separated from the door body.

While the disclosure has been particularly described with reference to exemplary embodiments, it should be understood by those of skill in the art that various changes in form and details may be made without departing from the spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:
   a main body having a front side thereof that is open; and
   a door rotatably coupled to the main body and configured to open and close the open front side of the main body,
   wherein the door includes:
      a door panel including a panel body having panel bent portions at side end portions of the panel body, an upper trim at an upper portion of the panel body, a lower trim at a lower portion of the panel body, and side trims at portions of left and right sides of the panel body,
      a door body to which the door panel is separably mountable,
   wherein
      the panel body is positioned in front of the door body,
      the door body includes chassis having accommodation portions configured to cover the panel bent portions of the panel body,
      the accommodation portions are provided to support the panel bent portions when the door panel is mounted to the door body,
      each of the side trims includes a magnetic body, and
      the door body includes a cover provided to have the side trims attached thereto by a magnetic force.

2. The refrigerator of claim 1, wherein the panel body is formed of an iron plate.

3. The refrigerator of claim 1, wherein the chassis protrude further forward than the cover at opposite sides of the cover to form a space together with the cover in which the door panel is mounted.

4. The refrigerator of claim 3, wherein the door body includes a lower door cap coupled to a lower end of each of the chassis, and a lower end portion of the panel body is supported by the lower door cap.

5. The refrigerator of claim 4, wherein
   the door body includes an upper door cap coupled to an upper end of each of the chassis,
   the lower door cap and the upper door cap form a space together with the chassis and the cover in which the door panel is mounted.

6. The refrigerator of claim 1, wherein when the door panel is mounted on the door body, the panel body protrudes further forward than the chassis.

7. The refrigerator of claim 1, wherein the door panel includes a buffer member attached to a surface of the panel body facing the door body when the door panel is mounted on the door body, and including a shock absorbing material or a sound absorbing material.

8. The refrigerator of claim 7, wherein the side trims are arranged at opposite sides of the buffer member.

* * * * *